(12) United States Patent
Ellis

(10) Patent No.: US 8,082,568 B2
(45) Date of Patent: Dec. 20, 2011

(54) ELECTRONIC PROGRAM GUIDE WITH INTEGRATED PROGRAM LISTINGS

(75) Inventor: Michael D Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 2162 days.

(21) Appl. No.: 10/383,281

(22) Filed: Mar. 5, 2003

(65) Prior Publication Data
US 2003/0149980 A1   Aug. 7, 2003

Related U.S. Application Data

(63) Continuation of application No. 09/157,256, filed on Sep. 17, 1998, now abandoned.

(51) Int. Cl.
*G06F 13/00* (2006.01)
*G06F 3/00* (2006.01)
*H04N 5/445* (2011.01)
*H04N 7/16* (2011.01)

(52) U.S. Cl. .............. 725/48; 725/59; 725/141

(58) Field of Classification Search ............. 725/44, 725/48, 51, 141, 59
See application file for complete search history.

(56) References Cited

U.S. PATENT DOCUMENTS

| | | | |
|---|---|---|---|
| 4,355,415 A | 10/1982 | George et al. | |
| 4,605,964 A | 8/1986 | Chard | |
| 4,638,424 A | 1/1987 | Beglin et al. | |
| 4,641,203 A | 2/1987 | Miller | |
| 4,680,647 A | 7/1987 | Moriyama | |
| 4,694,490 A | 9/1987 | Harvey et al. | |
| 4,718,107 A | 1/1988 | Hayes | |
| 4,751,578 A | 6/1988 | Reiter et al. | |
| 4,754,326 A | 6/1988 | Kram et al. | |
| 4,771,375 A | 9/1988 | Beglin et al. | |
| 4,837,584 A | 6/1989 | Sharkey et al. | |
| 4,847,698 A | 7/1989 | Freeman | |
| 4,857,999 A | 8/1989 | Welsh | |
| 4,873,584 A | 10/1989 | Hashimoto | |
| 4,908,707 A | 3/1990 | Kinghorn | |

(Continued)

FOREIGN PATENT DOCUMENTS

CN   1174477   2/1998

(Continued)

OTHER PUBLICATIONS

The New York Times, "2 Makers Plan Introductions of Digital VCR", by John Markoff, Mar. 29, 1999.

(Continued)

*Primary Examiner* — Hunter Lonsberry
(74) *Attorney, Agent, or Firm* — Ropes & Gray LLP

(57) ABSTRACT

An interactive television program guide system with digital storage is provided. The program guide gives users the ability to store information associated with recorded programs in a directory in the digital storage device thereby providing easy access to program information. The program guide may also provide a global media library for indicating the programs stored on removable storage media used with the program guide. The guide may also allow the user to manage and maintain a user media library to do the same. Non-time-sensitive data associated with recorded programs may be stored in a way that allows the user to interact with the data on playback as if the program were being originally aired. The program guide also allows the user to define "super-programs" for playback of a sequence of stored programs or program segments.

93 Claims, 27 Drawing Sheets

---

VOLUME NAME: DISC ONE       EST. TIME REMAINING: 500 MIN

| TITLE | CHANNEL | RECORD DATE | RECORD TIME | DURATION | VIEWED |
|---|---|---|---|---|---|
| M*A*S*H* | 11 | 5/1/98 | 8:00PM | 30 MIN | NO |
| TERMINATOR | 4 | 5/2/98 | 8:00PM | 120 MIN | YES |
| WILD AFRICA | 18 | 5/3/98 | 7:00PM | 60 MIN | YES |

SUPER PROGRAM

U.S. PATENT DOCUMENTS

| | | | |
|---|---|---|---|
| 4,908,713 A | 3/1990 | Levine | |
| 4,930,158 A | 5/1990 | Vogel | |
| 4,949,187 A | 8/1990 | Cohen | |
| 4,959,720 A | 9/1990 | Duffield et al. | |
| 4,963,995 A | 10/1990 | Lang | |
| 4,977,455 A | 12/1990 | Young | 358/142 |
| 4,991,012 A | 2/1991 | Yoshino | |
| 5,047,867 A | 9/1991 | Strubbe et al. | |
| 5,053,948 A | 10/1991 | DeClute et al. | |
| 5,057,932 A | 10/1991 | Lang | |
| 5,109,279 A | 4/1992 | Ando | |
| 5,111,296 A | 5/1992 | Duffield et al. | |
| 5,134,719 A | 7/1992 | Mankovitz | |
| 5,151,789 A | 9/1992 | Young | 358/194.1 |
| 5,172,413 A | 12/1992 | Bradley et al. | |
| 5,187,589 A | 2/1993 | Kono et al. | |
| 5,195,134 A | 3/1993 | Inoue | |
| 5,200,822 A | 4/1993 | Bronfin et al. | |
| 5,223,924 A | 6/1993 | Strubbe | 358/86 |
| 5,231,543 A | 7/1993 | Kubota et al. | |
| 5,253,066 A | 10/1993 | Vogel | |
| 4,706,121 A | 12/1993 | Young | 358/142 |
| 5,283,560 A | 2/1994 | Bartlett | |
| 5,293,357 A | 3/1994 | Hallenbeck | |
| 5,315,452 A | 5/1994 | Hong | |
| 5,335,277 A | 8/1994 | Harvey et al. | |
| 5,351,075 A | 9/1994 | Hertz et al. | |
| 5,353,121 A | 10/1994 | Young et al. | 348/563 |
| 5,390,027 A | 2/1995 | Henmi et al. | |
| 5,412,720 A | 5/1995 | Hoarty | |
| 5,414,569 A | 5/1995 | Sekiguchi et al. | |
| 5,442,389 A | 8/1995 | Blahut et al. | |
| 5,446,488 A | 8/1995 | Vogel | |
| 5,461,415 A | 10/1995 | Wolf et al. | |
| 5,469,206 A | 11/1995 | Strubbe et al. | |
| 5,479,266 A | 12/1995 | Young et al. | |
| 5,479,268 A | 12/1995 | Young et al. | 358/335 |
| 5,479,302 A | 12/1995 | Haines | |
| 5,483,278 A | 1/1996 | Strubbe et al. | |
| 5,485,197 A | 1/1996 | Hoarty | |
| 5,488,409 A | 1/1996 | Yuen et al. | 348/5 |
| 5,508,815 A | 4/1996 | Levine | |
| 5,517,254 A | 5/1996 | Monta et al. | |
| 5,517,257 A | 5/1996 | Dunn et al. | |
| 5,523,794 A | 6/1996 | Mankovitz et al. | 348/460 |
| 5,523,796 A | 6/1996 | Marshall et al. | |
| 5,524,195 A | 6/1996 | Clanton, III et al. | |
| 5,532,754 A | 7/1996 | Young et al. | 348/569 |
| 5,534,911 A | 7/1996 | Levitan | 348/1 |
| 5,537,141 A | 7/1996 | Harper et al. | 348/12 |
| 5,539,449 A | 7/1996 | Blahut et al. | |
| 5,541,738 A | 7/1996 | Mankovitz | 358/335 |
| 5,543,852 A | 8/1996 | Yuen et al. | 348/478 |
| 5,543,929 A | 8/1996 | Mankovitz et al. | |
| 5,550,576 A | 8/1996 | Klosterman | 348/6 |
| 5,581,614 A | 12/1996 | Ng et al. | 380/20 |
| 5,583,560 A | 12/1996 | Florin et al. | |
| 5,583,561 A | 12/1996 | Baker et al. | |
| 5,583,563 A | 12/1996 | Wanderscheid et al. | |
| 5,585,838 A * | 12/1996 | Lawler et al. | 725/54 |
| 5,585,858 A | 12/1996 | Harper et al. | |
| 5,585,866 A | 12/1996 | Miller et al. | |
| 5,589,892 A | 12/1996 | Knee et al. | 348/731 |
| 5,592,551 A | 1/1997 | Lett et al. | |
| 5,594,491 A | 1/1997 | Hodge et al. | |
| 5,602,582 A | 2/1997 | Wanderscheid et al. | |
| 5,616,876 A | 4/1997 | Cluts | |
| 5,619,247 A | 4/1997 | Russo | |
| 5,619,274 A | 4/1997 | Roop et al. | 348/461 |
| 5,619,570 A | 4/1997 | Tsutsui | |
| 5,621,579 A | 4/1997 | Yuen | 386/121 |
| 5,625,464 A | 4/1997 | Compoint et al. | |
| 5,630,119 A | 5/1997 | Aristides et al. | |
| 5,632,007 A | 5/1997 | Freeman | 395/75 |
| 5,648,824 A | 7/1997 | Dunn et al. | |
| 5,652,613 A | 7/1997 | Lazarus et al. | 348/7 |
| 5,654,747 A | 8/1997 | Ottesen et al. | |
| 5,654,748 A | 8/1997 | Matthews, III | |
| 5,654,886 A | 8/1997 | Zereski, Jr. et al. | |
| 5,657,072 A | 8/1997 | Aristides et al. | |
| 5,659,367 A | 8/1997 | Yuen | 348/465 |
| 5,666,645 A | 9/1997 | Thomas et al. | |
| 5,671,607 A | 9/1997 | Clemens et al. | |
| 5,675,734 A | 10/1997 | Hair | |
| 5,684,511 A | 11/1997 | Westerink et al. | |
| 5,684,525 A | 11/1997 | Klosterman | 348/12 |
| 5,686,954 A | 11/1997 | Yoshinobu et al. | |
| 5,692,214 A | 11/1997 | Levine | |
| 5,694,163 A | 12/1997 | Harrison | |
| 5,699,107 A | 12/1997 | Lawler et al. | |
| 5,701,383 A | 12/1997 | Russo et al. | 386/46 |
| 5,710,601 A | 1/1998 | Marshall et al. | |
| 5,717,452 A | 2/1998 | Janin et al. | |
| 5,724,203 A | 3/1998 | Kwoh et al. | 360/72.3 |
| 5,724,546 A | 3/1998 | Tsutsui | |
| 5,727,060 A | 3/1998 | Young | 380/10 |
| 5,731,844 A | 3/1998 | Rauch et al. | |
| 5,732,216 A | 3/1998 | Logan et al. | |
| 5,745,710 A | 4/1998 | Clanton, III et al. | |
| 5,751,282 A | 5/1998 | Girard et al. | |
| 5,752,159 A | 5/1998 | Faust et al. | |
| 5,754,771 A | 5/1998 | Epperson et al. | |
| 5,758,257 A | 5/1998 | Herz et al. | 455/2 |
| 5,760,821 A | 6/1998 | Ellis et al. | |
| 5,761,607 A | 6/1998 | Gudesen | |
| 5,761,662 A | 6/1998 | Dasan | |
| 5,768,528 A | 6/1998 | Stumm | |
| 5,771,354 A | 6/1998 | Crawford | |
| 5,774,859 A | 6/1998 | Houser et al. | |
| 5,778,181 A | 7/1998 | Hidary et al. | |
| 5,778,182 A | 7/1998 | Cathey et al. | |
| 5,781,226 A | 7/1998 | Sheehan | |
| 5,781,228 A | 7/1998 | Sposato | |
| 5,790,198 A | 8/1998 | Roop et al. | 348/460 |
| 5,790,935 A | 8/1998 | Payton | |
| 5,796,952 A | 8/1998 | Davis et al. | |
| 5,801,787 A | 9/1998 | Schein et al. | 348/569 |
| 5,802,284 A | 9/1998 | Karlton et al. | |
| 5,805,763 A | 9/1998 | Lawler et al. | 386/83 |
| 5,805,804 A | 9/1998 | Laursen et al. | |
| 5,808,608 A | 9/1998 | Young et al. | 345/327 |
| 5,809,204 A | 9/1998 | Young et al. | 386/83 |
| 5,812,123 A | 9/1998 | Rowe et al. | |
| 5,812,205 A | 9/1998 | Milnes et al. | 348/460 |
| 5,818,438 A | 10/1998 | Howe et al. | |
| 5,819,019 A | 10/1998 | Nelson | |
| 5,828,945 A | 10/1998 | Klosterman | 455/4.2 |
| 5,850,218 A | 12/1998 | LaJoie et al. | |
| 5,851,149 A | 12/1998 | Xidos et al. | |
| 5,861,906 A | 1/1999 | Dunn | |
| 5,867,226 A | 2/1999 | Wehmeyer | |
| 5,883,621 A | 3/1999 | Iwamura | |
| 5,892,536 A | 4/1999 | Logan et al. | |
| 5,899,576 A | 5/1999 | Fukuzawa | |
| 5,907,322 A | 5/1999 | Kelly et al. | |
| 5,909,212 A | 6/1999 | Nishina et al. | |
| 5,920,700 A | 7/1999 | Gordon et al. | |
| 5,949,954 A | 9/1999 | Young et al. | |
| 5,988,078 A | 11/1999 | Levine | |
| 5,999,688 A | 12/1999 | Iggulden et al. | |
| 6,002,444 A | 12/1999 | Marshall et al. | |
| 6,006,257 A | 12/1999 | Slezak | |
| 6,023,267 A | 2/2000 | Chapuis et al. | |
| 6,052,145 A | 4/2000 | Macrae et al. | |
| 6,058,238 A | 5/2000 | Ng | 386/46 |
| 6,091,883 A | 7/2000 | Artigalas et al. | |
| 6,091,884 A | 7/2000 | Yuen et al. | 386/83 |
| 6,115,057 A | 9/2000 | Kwoh et al. | 348/5.5 |
| 6,122,011 A | 9/2000 | Dias et al. | 348/569 |
| 6,125,230 A | 9/2000 | Yaginuma | |
| 6,125,231 A | 9/2000 | Yuen et al. | 386/83 |
| 6,147,715 A | 11/2000 | Yuen et al. | 348/565 |
| 6,166,778 A | 12/2000 | Yamamoto et al. | |
| 6,167,188 A | 12/2000 | Young et al. | |
| 6,169,844 B1 | 1/2001 | Arai | |
| 6,177,931 B1 | 1/2001 | Alexander et al. | 345/327 |
| 6,185,360 B1 | 2/2001 | Inoue et al. | |

| | | | | | | |
|---|---|---|---|---|---|---|
| 6,208,335 | B1 | 3/2001 | Gordon et al. | JP | 03-226083 | 10/1991 |
| 6,219,489 | B1 | 4/2001 | Ohta et al. | JP | 03-286483 | 12/1991 |
| 6,219,839 | B1 * | 4/2001 | Sampsell ............... 725/40 | JP | 4-105285 | 4/1992 |
| 6,226,444 | B1 | 5/2001 | Goldschmidt Iki et al. | JP | 05-101471 | 4/1993 |
| 6,233,389 | B1 | 5/2001 | Barton et al. | JP | 05-260554 | 10/1993 |
| 6,240,241 | B1 | 5/2001 | Yuen ............... 386/95 | JP | 6-111413 | 4/1994 |
| 6,324,338 | B1 | 11/2001 | Wood et al. ............ 386/83 | JP | 06-133334 | 5/1994 |
| 6,327,418 | B1 | 12/2001 | Barton | JP | 06-236592 | 8/1994 |
| 6,334,022 | B1 | 12/2001 | Ohba et al. | JP | 6-303541 | 10/1994 |
| 6,344,939 | B2 | 2/2002 | Oguro | JP | 07-044930 | 2/1995 |
| 6,377,745 | B2 | 4/2002 | Akiba et al. | JP | 7-230666 | 8/1995 |
| 6,419,137 | B1 | 7/2002 | Marshall et al. | JP | 8-77763 | 3/1996 |
| 6,441,832 | B1 | 8/2002 | Tao et al. | JP | 9-245467 | 9/1997 |
| RE37,881 | E | 10/2002 | Haines | JP | 9-259515 | 10/1997 |
| 6,473,559 | B1 | 10/2002 | Knudson et al. | JP | 09-289630 | 11/1997 |
| 6,487,362 | B1 | 11/2002 | Yuen et al. | JP | 10-042242 | 2/1998 |
| 6,498,895 | B2 | 12/2002 | Young et al. | JP | 10-091534 | 4/1998 |
| 6,553,178 | B2 | 4/2003 | Abecassis | JP | 10-092161 | 4/1998 |
| 6,732,366 | B1 | 5/2004 | Russo | JP | 10-093879 | 4/1998 |
| 6,788,882 | B1 | 9/2004 | Geer et al. | JP | 10-93905 | 4/1998 |
| 6,820,278 | B1 | 11/2004 | Ellis | JP | 10-112087 | 4/1998 |
| 6,832,385 | B2 | 12/2004 | Young et al. | JP | 10-164487 | 6/1998 |
| 6,850,693 | B2 | 2/2005 | Young et al. | JP | 10-191221 | 7/1998 |
| 6,934,964 | B1 | 8/2005 | Schaffer et al. | JP | 10-215440 | 8/1998 |
| 7,096,486 | B1 | 8/2006 | Ukai et al. | JP | 10-243309 | 9/1998 |
| 7,187,847 | B2 | 3/2007 | Young et al. | JP | 10-243344 | 9/1998 |
| 7,209,640 | B2 | 4/2007 | Young et al. | JP | 10-243352 | 9/1998 |
| 7,477,832 | B2 | 1/2009 | Young et al. | JP | 11-177962 | 7/1999 |
| 7,529,465 | B2 | 5/2009 | Barton et al. | KR | 1992-0015347 | 8/1992 |
| 7,533,400 | B1 * | 5/2009 | Hailey et al. ............ 725/49 | TW | 247388 | 10/1994 |
| 7,793,322 | B2 | 9/2010 | Hassell et al. | WO | WO 88/04507 | 6/1988 |
| 7,925,141 | B2 * | 4/2011 | Geer et al. ............ 386/341 | WO | WO 90/00847 | 1/1990 |
| 2001/0043795 | A1 | 11/2001 | Wood et al. | WO | WO 90/15507 | 12/1990 |
| 2003/0044165 | A1 | 3/2003 | Wood et al. | WO | WO 91/00670 | 1/1991 |
| 2003/0196201 | A1 | 10/2003 | Schein et al. | WO | WO 91/07050 | 5/1991 |
| 2004/0128686 | A1 | 7/2004 | Boyer et al. | WO | WO 92/04801 | 3/1992 |
| 2004/0181814 | A1 | 9/2004 | Ellis et al. | WO | WO 92/22983 | 12/1992 |
| 2004/0261108 | A1 | 12/2004 | Yuen et al. | WO | WO 93/04473 | 3/1993 |
| 2005/0204388 | A1 | 9/2005 | Knudson et al. | WO | WO 93/08542 | 4/1993 |
| 2005/0240962 | A1 | 10/2005 | Cooper et al. | WO | WO 95/01058 | 1/1995 |
| | | | | WO | WO 95/04431 | 2/1995 |
| | | FOREIGN PATENT DOCUMENTS | | WO | WO 95/11567 | 4/1995 |
| CN | | 1174477 A | 2/1998 | WO | WO 95/18449 | 7/1995 |
| DE | | 3 610 600 | 10/1987 | WO | WO 95/31069 | 11/1995 |
| EP | | 0 424 469 B1 | 5/1991 | WO | WO 95/32584 | 11/1995 |
| EP | | 0 472 147 | 2/1992 | WO | WO 95/32585 | 11/1995 |
| EP | | 0584991 | 3/1994 | WO | WO 95/32587 | 11/1995 |
| EP | | 0665551 | 8/1995 | WO | WO 96/09721 | 3/1996 |
| EP | | 0711073 | 5/1996 | WO | WO 96/13932 | 5/1996 |
| EP | | 0713334 | 5/1996 | WO | WO 96/25821 | 8/1996 |
| EP | | 0744866 | 11/1996 | WO | WO 96/27982 | 9/1996 |
| EP | | 0 753 964 | 1/1997 | WO | WO 96/31980 | 10/1996 |
| EP | | 0 762 756 | 3/1997 | WO | WO 96/33572 | 10/1996 |
| EP | | 0 763 938 A2 | 3/1997 | WO | WO 96/33579 | 10/1996 |
| EP | | 0 797 355 | 9/1997 | WO | WO 96/34491 | 10/1996 |
| EP | | 0 822 713 | 2/1998 | WO | WO 96/36172 | 11/1996 |
| EP | | 0849958 | 6/1998 | WO | WO 96/41472 | 12/1996 |
| EP | | 0 874 524 | 10/1998 | WO | WO 96/41478 | 12/1996 |
| EP | | 0 874 524 A1 | 10/1998 | WO | WO 97/05616 | 2/1997 |
| EP | | 0872834 | 10/1998 | WO | WO 97/13368 | 4/1997 |
| EP | | 0 843 468 A3 | 12/1998 | WO | WO 97/31479 | 8/1997 |
| EP | | 0 924 927 | 6/1999 | WO | WO 97/32434 | 9/1997 |
| EP | | 0936811 | 8/1999 | WO | WO 97/34413 | 9/1997 |
| EP | | 0 940 985 A2 | 9/1999 | WO | WO 97/34414 | 9/1997 |
| EP | | 0 969 661 | 1/2000 | WO | WO 97/40623 | 10/1997 |
| EP | | 1 377 049 | 1/2004 | WO | WO 97/42763 | 11/1997 |
| EP | | 1581001 | 9/2005 | WO | WO 97/46008 | 12/1997 |
| EP | | 0848383 | 10/2005 | WO | WO 97/46016 | 12/1997 |
| EP | | 1 613 066 | 1/2006 | WO | WO 97/46943 | 12/1997 |
| GB | | 2 219 886 | 12/1989 | WO | WO 97/47124 | 12/1997 |
| GB | | 2298544 | 9/1996 | WO | WO 97/48228 | 12/1997 |
| JP | | 60-69850 | 4/1985 | WO | WO 97/48230 | 12/1997 |
| JP | | 60-171685 | 9/1985 | WO | WO 97/49057 | 12/1997 |
| JP | | 62-060378 | 3/1987 | WO | WO 97/49237 | 12/1997 |
| JP | | 64-013278 | 1/1989 | WO | WO 97/49242 | 12/1997 |
| JP | | 10-093936 | 4/1989 | WO | WO 98/01995 | 1/1998 |
| JP | | 01-209399 | 8/1989 | WO | WO 98/06219 | 2/1998 |
| JP | | 1-213853 | 8/1989 | WO | WO 98/07277 | 2/1998 |
| JP | | 2-81385 | 3/1990 | WO | WO 98/10589 | 3/1998 |

| | | |
|---|---|---|
| WO | WO 98/12872 | 3/1998 |
| WO | WO 98/16056 | 4/1998 |
| WO | WO 98/17064 | 4/1998 |
| WO | WO 98/26594 | 6/1998 |
| WO | WO 98/26596 | 6/1998 |
| WO | WO 98/38831 | 9/1998 |
| WO | WO 98/39893 | 9/1998 |
| WO | WO 98/47279 | 10/1998 |
| WO | WO 98/47283 | 10/1998 |
| WO | WO 98/47287 | 10/1998 |
| WO | WO 98/47289 | 10/1998 |
| WO | WO 99/03267 | 1/1999 |
| WO | WO 99/33265 | 7/1999 |
| WO | WO 99/57839 | 11/1999 |
| WO | WO 99/60790 | 11/1999 |
| WO | WO 00/01149 | 1/2000 |
| WO | WO 00/02385 | 1/2000 |
| WO | WO 00/07368 | 2/2000 |
| WO | WO 00/08852 | 2/2000 |
| WO | WO 00/11869 | 3/2000 |
| WO | WO 00/16548 | 3/2000 |
| WO | WO 00/27122 | 5/2000 |

OTHER PUBLICATIONS

"Computer Science an Overview", 5th Edition, Addison Wesley, ISBN-0-8053-4632, pp. 25-28.
"Startup puts MPEG-2 encoder in fast forward", EE Times.
Article entitled "Automating in a digital world, servers lead the way into the new realm of DTV", Broadcasting and Cable, published Nov. 24, 1997.
Results listing from web.archive.org showing the archive date of Oct. 9, 1997 as the archived date of document D3.
European Search Opinion dated Dec. 19, 2005.
FTP file listing of doc/resource-guide/front-matter at ftp.cs.toronto.edu.
IBM Technical Disclosure Bulletin, vol. 33, No. 3B, published Aug. 1990.
Louth Automation website (www.louth.com) dated Aug. 1997.
Manual for Internet Explorer 4—Chapter 9—Browser Features and Functionality.
Norton Backup, Version 1.0, User's Guide and reference, published in 1990 (chapters 3 and 4).
Overview of Pro-Bell/Chyron's MAPP software published on or after Jan. 1999.
Patentee's Response to the EESR, filed on Aug. 1, 2006.
RFC 765—File Transfer Protocol Specification.
Sony SLV-760IIF et al. operating instructions (Sony 2"), published in 1995.
The New York Times on the Web, "2 Makers Plan Introductions of Digital VCR" by John Markoff, Mar. 29, 1999.
TV Guide Magazine dated Feb. 4-10, 1989 (excerpts).
U.S. Appl. No. 09/157,256, filed Sep. 17, 1998.
U.S. Appl. No. 10/383,313, filed Mar. 5, 2003.
U.S. Appl. No. 10/383,311, filed Mar. 5, 2003.
U.S. Appl. No. 10/734,505, filed Dec. 12, 2003.
U.S. Appl. No. 11/580,729, filed Oct. 13, 2006.
U.S. Appl. No. 11/197,867, filed Aug. 4, 2005.
U.S. Appl. No. 11/894,617, filed Aug. 20, 2007.
U.S. Appl. No. 11/894,652, filed Aug. 20, 2007.
Dinwiddie et al., "Combined-User Interface for Computers, Television, Video Recorders, and Telephone, Etc.," IP.com Prior Art Database Bulletin, Mar. 16, 2005.
Hallenbeck et al., "Personal Home TV Programming Guide," Digest of Technical Papers of the International Conference on Consumer Electronics, Jun. 6-8, 1990, pp. 310-311.
IEEE 1990 International Conference on Consumer Electronics Digest of Technical Papers, Table of Contents, Jun. 6-8, 1990.
"VPS weiterentwickelt: Service Uber Videotext," Funkschau Recorder-Programmierung, Nov. 1986, pp. 40-43 with English translation.
Karon, P., "Replay to Bow, Instant VCR", Daily Variety, Sep. 8, 1998.
Proceedings of Patent Infringement Action for European Patent Application No. 05077272.2, Jun. 12, 2009.
Sanyo Technical Report, No. 44, vol. 22, No. 1, Feb. 1990.
"Digital Video Broadcasting (DVB); DVB specification for data broadcasting", European Telecommunications Standards Institute, Draft EN 301 192 V1.2.1 (Jan. 1999).
"Electronic Programme Guide (EPG); Protocol for a TV Guide using electronic data transmission" by European Telecommunication Standards Institute, May 1997, Valbonne, France, publication No. ETS 300 707.
Healey, J., "Smart TV Recorders Get Another Player", San Jose Mercury News (California), Sep. 11, 1998.
Hofmann et al.; "Videotext Programmiert Videorecorder," Rundfunktechnische Mitteilungen, Nov.-Dec. 1982, pp. 254-257 (with translation).
Ohyama et al., Teletext System, National Technical Report, vol. 27, No. 4, Aug. 1981 (includes English Translation).
"Rewind, replay and unwind with new high-tech TV devices", by Lawrence J. Magid, LA Times. This document was printed from the Internet on Jun. 6, 1999 and bears a date of May 19, 1999.
Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, pp. 57-64.
"Windows 98 Feature Combines TV, Terminal and the Internet," New York Times, Aug. 18, 1998.

* cited by examiner

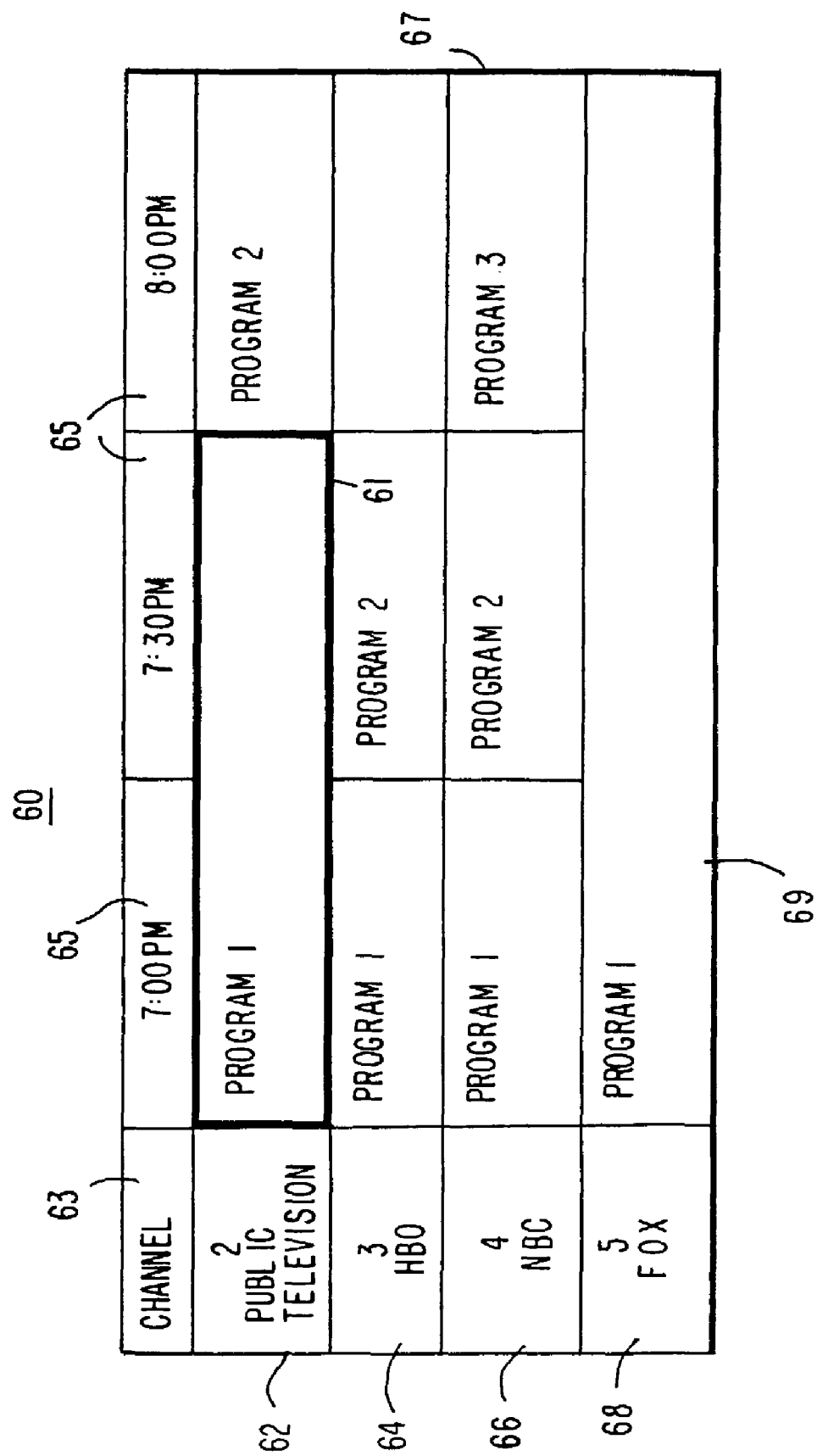

| CHANNEL | 7:00 PM | 7:30 PM | 8:00 PM |
|---|---|---|---|
| DIGITAL STORAGE | PROGRAM 1 | PROGRAM 2 | PROGRAM 3 |
| 2 PUBLIC TELEVISION | PROGRAM 1 | | PROGRAM 2 |
| 3 HBO | PROGRAM 1 | PROGRAM 2 | |
| 4 NBC | PROGRAM 1 | PROGRAM 2 | PROGRAM 3 |
| 5 FOX | PROGRAM 1 | | |

*FIG. 5b*

PROGRAM LISTING INFORMATION

TITLE: M*A*S*H
DESCRIPTION: SITUATION COMEDY ABOUT LIFE IN A MASH UNIT DURING THE KOREAN WAR
EPISODE: 1975 EPISODE 5
CHANNEL: 11
DURATION: 30 MIN.
VIEWED: NO
CAST MEMBERS: ALAN ALDA, LORETTA SWITT
CATEGORY(IES): COMEDY, WAR
LANGUAGE(S): ENGLISH
VIDEO FORMAT: NORMAL TV
OTHER INFORMATION: MASH WEB SITE

VOLUME NAME: DISC ONE                    EST. TIME REMAINING: 50 MIN

| TITLE | CHANNEL | RECORD DATE | RECORD TIME | DURATION |
|---|---|---|---|---|
| M*A*S*H | 11 | 5/1/98 | 8:00PM | 30 MIN |
| TERMINATOR | 4 | 5/2/98 | 8:00PM | 120 MIN |
| WILD-AFRICA | 18 | 5/3/98 | 7:00PM | 60 MIN |

80
81
82
83
89

PROGRAM LISTING INFORMATION

TITLE: M*A*S*H

DESCRIPTION: SITUATION COMEDY ABOUT LIFE IN A MASH UNIT DURING THE KOREAN WAR

USER DESCRIPTION: PARTY EPISODE ~85

EPISODE: 1975 EPISODE 5

CHANNEL: 11

DURATION: 30 MIN.

VIEWED: NO

CAST MEMBERS: ALAN ALDA, LORETTA SWITT

CATEGORY(IES): COMEDY, WAR ~89

USER CATEGORY(IES): DAD'S FAVORITES ~86

LANGUAGE(S): ENGLISH

VIDEO FORMAT: NORMAL TV

OTHER INFORMATION: MASH WEB SITE

USER OTHER: ~88

| CHANNEL | TIME BEGIN | TIME END |
|---------|------------|----------|
| 5 | 8:00 PM | 10:00PM |

*FIG. 8*

VOLUME NAME: DISC ONE                    EST. TIME REMAINING: 500 MIN

| TITLE | CHANNEL | RECORD DATE | RECORD TIME | DURATION | VIEWED |
|---|---|---|---|---|---|
| M*A*S*H | 11 | 5/1/98 | 8:00PM | 30 MIN | NO |
| TERMINATOR | 4 | 5/2/98 | 8:00PM | 120 MIN | YES |
| WILD AFRICA | 18 | 5/3/98 | 7:00PM | 60 MIN | YES |
| SUPER PROGRAM | | | | | |

FULL ENTRY INFORMATION

TITLE: M*A*S*H
DESCRIPTION: SITUATION COMEDY ABOUT LIFE IN A MASH UNIT DURING THE KOREAN WAR
USER DESCRIPTION: PARTY EPISODE
EPISODE: 1975 EPISODE 5
CHANNEL: 11
DURATION: 30 MIN.
VIEWED: NO
CAST MEMBERS: ALAN ALDA, LORETTA SWITT
CATEGORY(IES): COMEDY, WAR
USER CATEGORY(IES): DAD'S FAVORITES — 101
LANGUAGE(S): ENGLISH
VIDEO FORMAT: NORMAL TV
OTHER INFORMATION: MASH WEB SITE
USER OTHER:

100

120

SET-UP

ENTRY INFORMATION DISPLAY OPTIONS 121

| TITLE | DESCRIPTION | EPISODE | CHANNEL |
|---|---|---|---|
| RECORD DATE | RECORD TIME | DURATION | CAST MEMBERS |
| PARENTAL CTRL | CATEGORY(IES) | LANGUAGE(S) | VIDEO FORMAT |
| OTHER INFO | VIEWED | | |

STORAGE OPTIONS 122

LANGUAGES          ENGLISH

VIDEO FORMAT       HDTV

ENFORCE PARENTAL CONTROL   YES
ON STORAGE

AUTO-ERASE VIEWED ENTRIES  YES

AVAILABLE LANGUAGES
ENGLISH
GERMAN
FRENCH
ITALIAN
SPANISH
ALL

PLAYBACK OPTIONS 133

DEFAULT LANGUAGE    ENGLISH

DEFAULT VIDEO       HDTV

SKIP COMMERCIALS    YES

*FIG. 14*

ELECTRONIC PROGRAM GUIDE WITH INTEGRATED PROGRAM LISTINGS

CROSS REFERENCE TO RELATED APPLICATION

This application is a continuation of U.S. patent application Ser. No. 09/157,256 now abandoned, filed Sep. 17, 1998, which is hereby incorporated by reference herein in its entirety.

BACKGROUND OF THE INVENTION

This invention relates to video systems, and more particularly, to interactive television program guide systems which allow for digital storage of programs and program related information.

Cable, satellite, and broadcast television systems provide viewers with a large number of television channels. Users have traditionally consulted printed television program schedules to determine the programs being broadcast at a particular time. More recently, interactive electronic television program guides have been developed that allow television program information to be displayed on a user's television.

Interactive program guides allow the user to navigate through television program listings using a remote control. In a typical program guide display, television listings are organized into subsets of listings according to multiple organization criteria and are sorted in various ways. One approach is to organize program listings into a program listings grid. Each row in the grid contains television program listings for a different channel. The columns in the grid correspond to a series of scheduled broadcast times. The user can scroll up or down to view program listings for different channels or may pan left or right to view information about programs being broadcast at different times.

Recently, interactive program guides have been developed that allow for storage of programs selected within the program guide on an independent storage device, typically a videocassette recorder. Usually, a control path involving an infrared transmitter coupled to an infrared receiver in the videocassette recorder is used to control the videocassette recorder. The use of independent analog storage devices like videocassette recorders, however, does not allow for the more advanced features that might be implemented if a digital storage device were associated with the program guide.

It is therefore an object of the present invention to provide an interactive television program guide with digital storage.

SUMMARY OF THE INVENTION

This and other objects of the invention are accomplished in accordance with the principles of the present invention by providing an interactive program guide system with digital storage that allows the program guide to be used to provide more advanced features than previously offered by interactive program guide systems.

Program guide data is provided by a data source in a satellite uplink facility. This information is transmitted to a television distribution facility such as a cable headend via satellite link. The television distribution facility distributes the information (and television programming signals) to user television equipment on which an interactive television program guide is implemented. One suitable distribution scheme involves transmitting television channels and distributing the information for program listings in the vertical blanking interval of one of the channels or a sideband.

The user television equipment for receiving and processing the television program listings and program data may include a set-top box. The set-top box is also able to receive the television programming distributed by the television distribution facility. The program guide implemented on the set-top box processes television program listings information and generates display screens (e.g., an interactive television program guide grid) for display, e.g., on a standard television monitor. The user can interact with the television program guide by entering commands via a user input interface. An illustrative input interface is an infrared remote control with cursor keys, a "guide" button, a "record" button, a "play" button, an "exit" button, an "info" button, and an "enter", "select", or "OK" button. The set-top box may store television programming and program information in a digital storage device associated with the program guide. The digital storage device may be an optical or a magnetic storage device (e.g., a device using writable digital video discs, magnetic disks, or a hard drive or random access memory (RAM), etc.).

The use of a digital storage device associated with the program guide provides the user with more advanced features than could be performed using an independent analog storage device. For example, the current invention gives the user the ability to store information associated with recorded programs in a directory in the digital storage device thereby providing easy access to program information. The program guide may also provide a global media library for indicating the programs stored on removable storage media used with the program guide. Non-time-sensitive data associated with recorded programs may be stored in a way that allows the user to interact with the data on playback as if the program were being originally aired. The program guide also allows the user to define "super-programs" for playback of a sequence of stored programs or program segments. The program guide may also provide for the transfer of programs and super-programs to other volumes of the digital storage device or to a secondary storage device.

Further features of the invention, its nature and various advantages will be more apparent from the accompanying drawings and the following detailed description of the preferred embodiments.

BRIEF DESCRIPTION OF THE DRAWINGS

FIGS. 4-14 are illustrative display screens in accordance with the present invention.

DETAILED DESCRIPTION OF THE PREFERRED EMBODIMENTS

Figure 1:
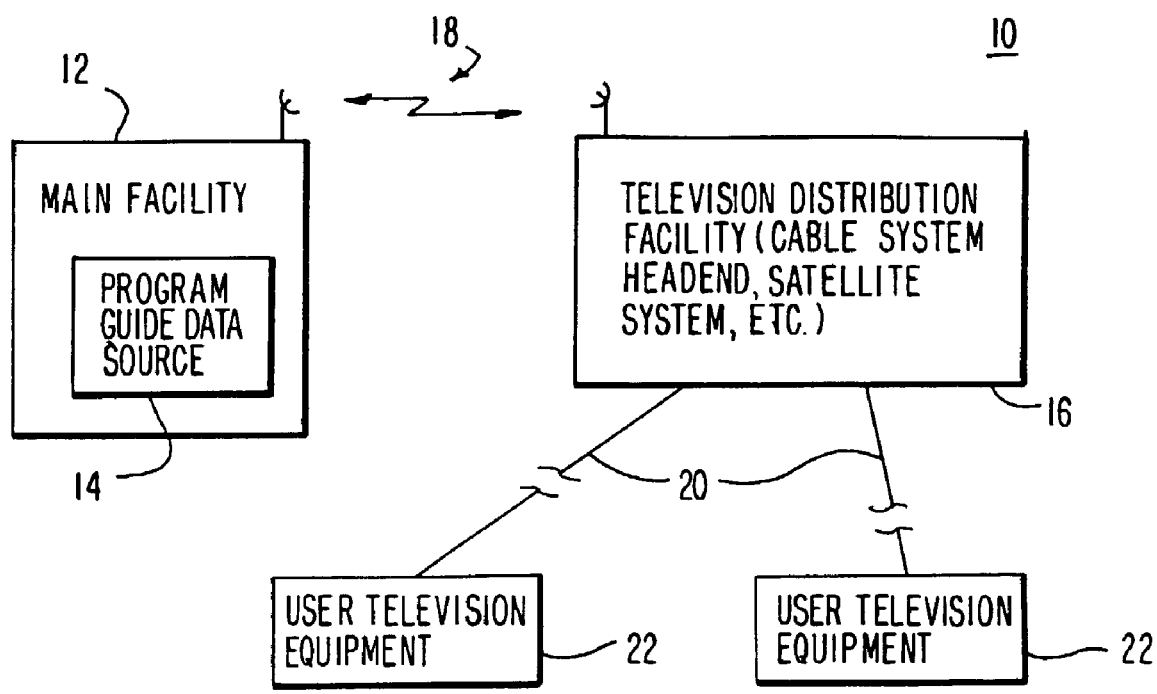
FIG. 1 is a schematic block diagram of a system in accordance with the present invention.

An illustrative system 10 in accordance with the present invention is shown in FIG. 1. Main facility 12 provides data from program guide data source 14 to television distribution facility 16 via communications link 18. There are preferably numerous television distribution facilities 16, although only one such facility is shown in FIG. 1 to avoid over-complicating the drawing. Link 18 may be a satellite link, a telephone network link, a cable or fiber optic link, a microwave link, a combination of such links, or any other suitable communications path. If it is desired to transmit video signals over link 18 in addition to data signals, a relatively high bandwidth link such as a satellite link may generally be preferred to a relatively low bandwidth link such as a telephone line. Television distribution facility 16 may be any suitable distribution facility (e.g., a cable system headend, a broadcast distribution facility, a satellite television distribution facility, or any other suitable distribution facility.

The data transmitted by main facility 12 to television distribution facility 16 includes television program listings data (e.g., program times, channels, titles, and descriptions) and other program data for additional services other than television program listings (e.g., weather information, associated Internet web links, computer software, etc.).

Television distribution facility 16 distributes the television program listings and additional data to multiple users via communications paths 20. Each user has user television equipment 22 for displaying the television program listings information using an interactive television program guide. Communication paths 20 preferably have sufficient bandwidth to allow television distribution facility 16 to distribute television programming to user television equipment 22. If desired, television programming may be provided over separate communications paths (not shown).

Figure 2:
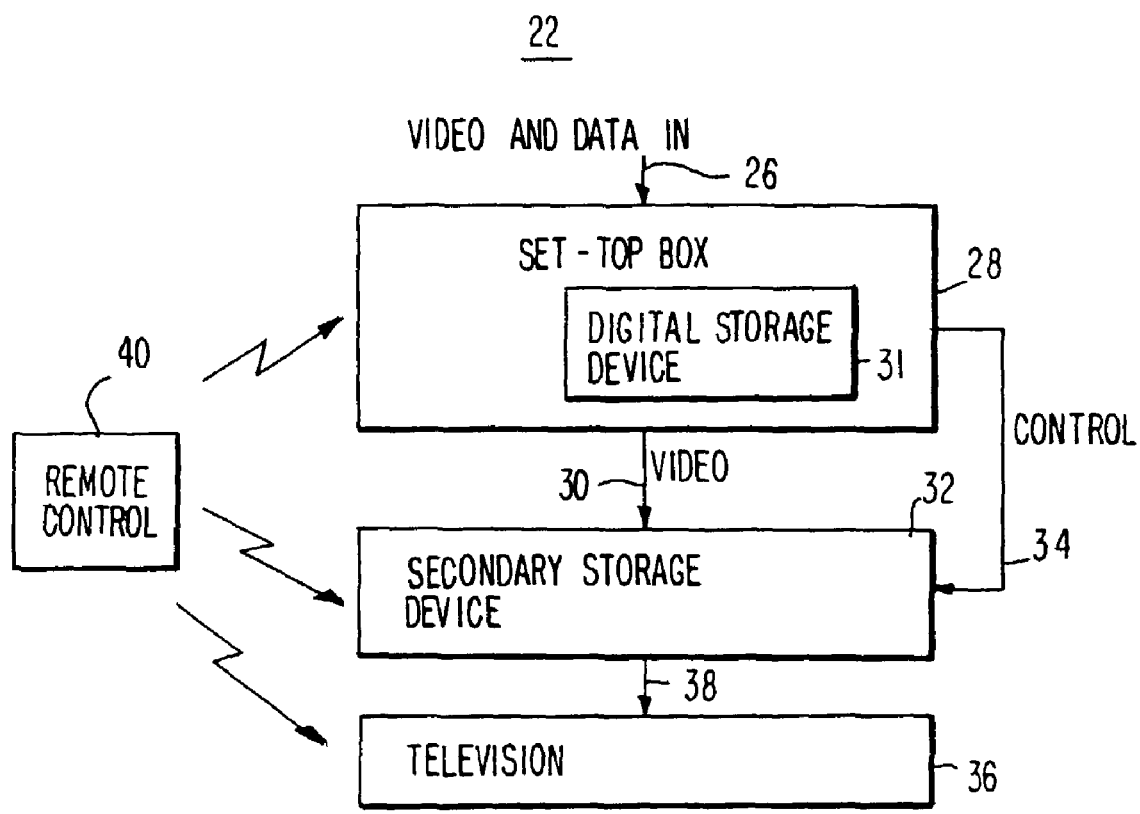
FIG. 2 is a schematic block diagram of illustrative user television equipment in accordance with the present invention.

An illustrative arrangement for user television equipment 22 is shown in FIG. 2. Television equipment 22 of FIG. 2 receives video and data from television distribution facility 16 (FIG. 1) at input 26. During normal television viewing, the user tunes set-top box 28 to a desired television channel. The signal for that television channel is then provided at video output 30. The outputted signal is typically either a radio-frequency (RF) signal on a predefined channel (e.g., channel 3 or 4), or a demodulated video signal, but may also be a digital signal provided to television 36 on an appropriate digital bus (e.g., a bus using the IEEE 1394 standard, (not shown)). The video signal at output 30 is received by optional secondary storage device 39. Secondary storage device 32 can be any suitable type of analog or digital program storage device (e.g., a videocassette recorder, a digital video disc (DVD) player with the ability to record DVD discs, etc.). Program recording and other features may be controlled by set-top box 28 using control path 34. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

The user may also record programs and program data in digital form on digital storage device 31. Digital storage device 31 may be a writable optical storage device (such as a DVD player capable of handling recordable DVD discs), a magnetic storage device (such as a disk drive or digital tape), or any other digital storage device. Digital storage device 31 preferably supports a directory structure containing information associated with stored entries. This directory information can be stored in one location, for example at the beginning or the end of the storage device. The directory information can also be distributed (e.g., by storing a portion of such information at the same location as each entry). For removable storage media like DVDs, each storage unit may have its own directory information, and the program guide may keep a global media library (discussed below).

Digital storage device 31 can be contained in set-top box 28 or it can be an external device connected to set-top box 28 via an output port and appropriate interface. If necessary, processing circuitry in set-top box 28 formats the received video, audio and data signals into a digital file format. Preferably, the file format is an open file format such as the Motion Pictures Expert Group (MPEG) MPEG-2 standard. The resulting data is streamed to digital storage device 31 via an appropriate bus (e.g., a bus using the IEEE 1394 standard), and is stored on digital storage device 31.

Television 36 receives video signals from secondary storage device 32 via communications path 38. The video signals on communications path 38 may either be generated by secondary storage device 32 when playing back a prerecorded storage medium (e.g., a videocassette or a recordable digital video disc), by digital storage device 31 when playing back a pre-recorded digital medium, may be passed through from set-top box 28, may be provided directly to television 36 from set-top box 28 if secondary storage device 32 is not included in user television equipment 22, or may be received directly by television 36. During normal television viewing, the video signals provided to television 36 correspond to the desired channel to which the user has tuned with set-top box 28. The video signals provided to television 36 may also be by set-top box 28 when set-top box 28 is used to play back information stored on digital storage device 31.

When the user wishes to access the features of the program guide, the user may use a "menu" key on remote control 40 or an appropriate key corresponding to the desired feature. For example, if the user wishes to view programming information, a "guide" key on remote control 40 can be used. When set-top box 28 receives commands from remote control 40 that inform set-top box 28 that the menu or other feature button has been pressed, processing circuitry within set-top box 28 supplies information that is displayed on television 36 as described further below.

Figure 3:
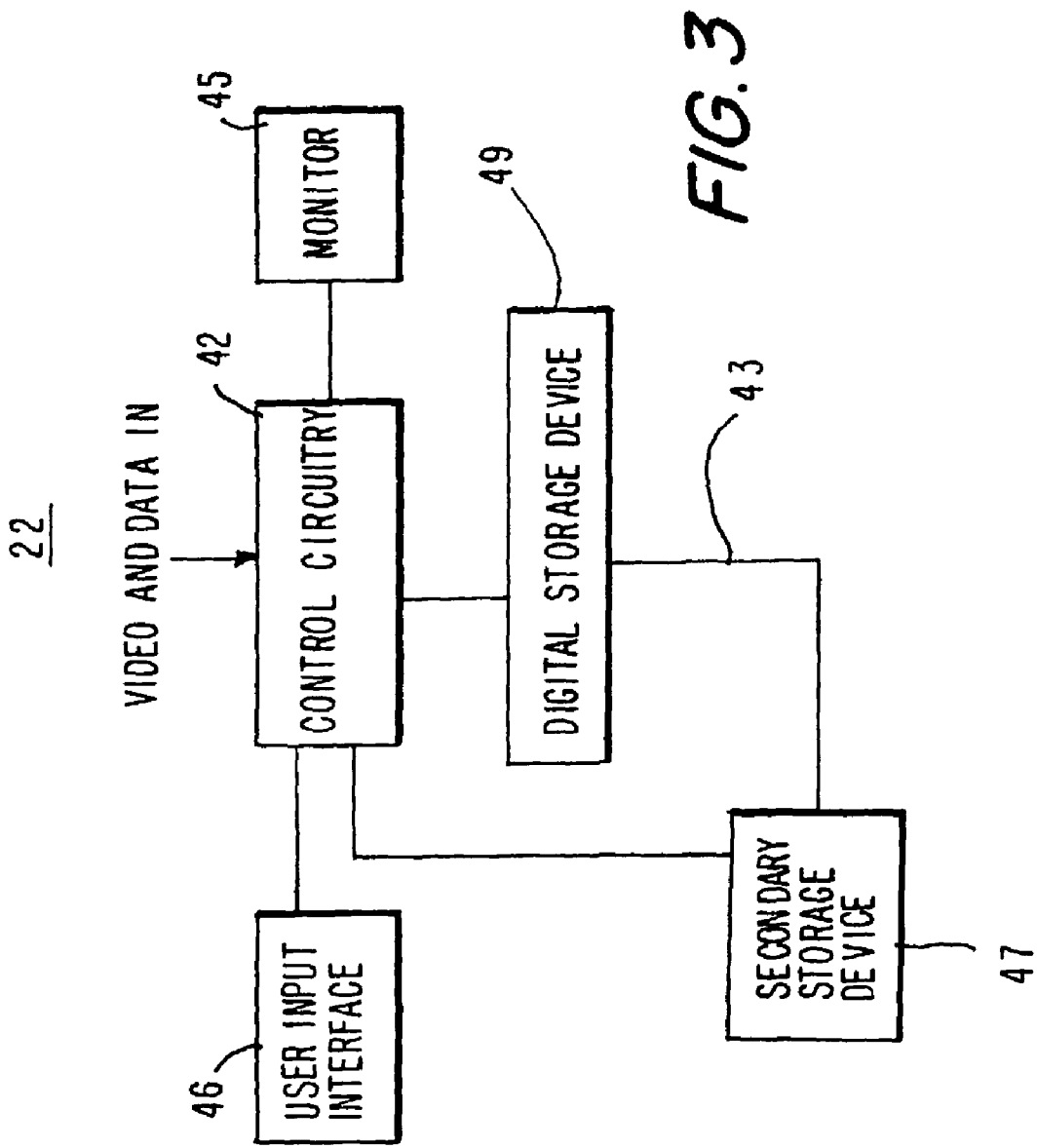
FIG. 3 is a generalized schematic block diagram of portions of the illustrative television equipment of FIG. 2.

A more generalized embodiment of user television equipment 22 (FIG. 2) is shown in FIG. 3. As shown in FIG. 3, program listings, programming and program data associated with the programming (hereinafter "associated program data") from television distribution facility 16 (FIG. 1) are received by control circuitry 42 of user television equipment 22. Video signals are typically provided on multiple television channels. Associated program data and program listings may be provided on a television channel sideband, in the vertical blanking interval of a television channel, using an in-band digital channel, using an out-of-band digital signal, or by any other suitable data transmission technique.

The user controls the operation of user television equipment 22 with user input interface 46. User input interface 46 may be a pointing device, wireless remote control, keyboard, touch-pad, voice recognition system, or any other suitable user input device. To watch television, the user instructs control circuitry 42 to display a desired television channel on monitor 45. To access the features of the program guide, the user instructs the program guide implemented on user television equipment 22 to generate a main menu or a desired program guide display screen for display on monitor 45.

The functions of control circuitry 42 may be provided using the set-top box arrangement of FIG. 2. Alternatively, these functions may be integrated into an advanced television receiver, personal computer television (PC/TV), or any other suitable arrangement. If desired, a combination of such arrangements may be used.

Figure 4:
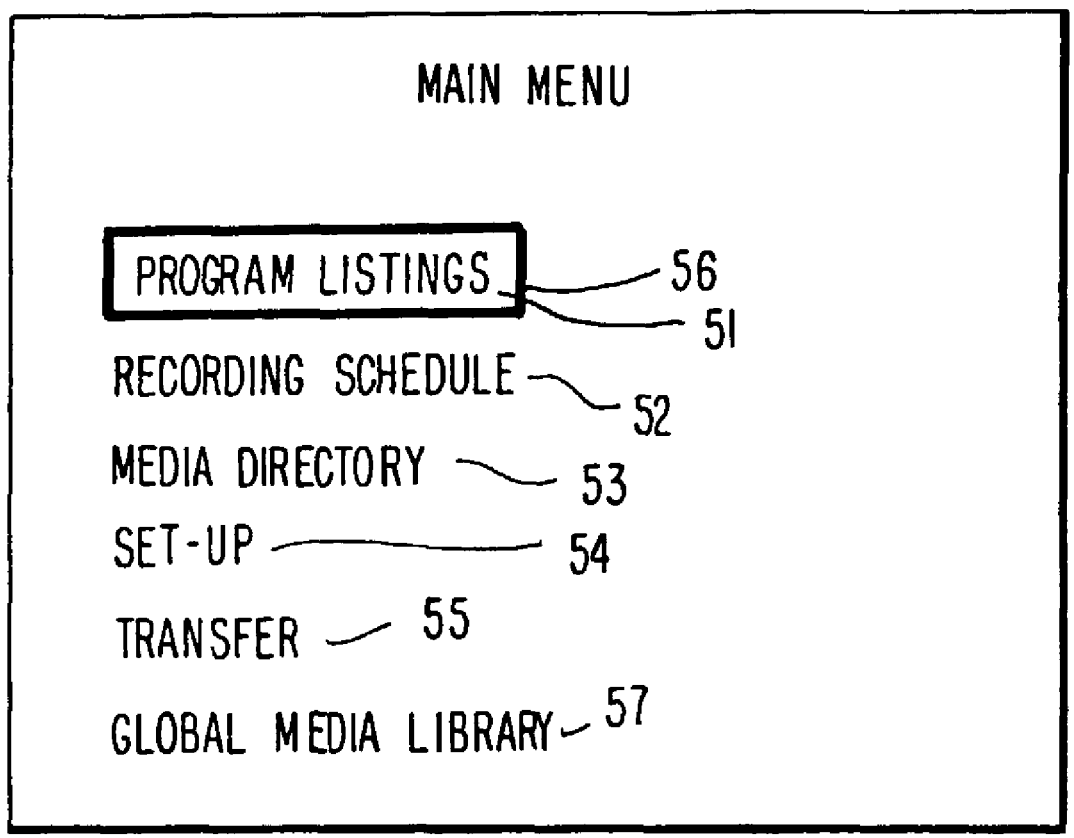

When a user indicates a desire to access the main menu or other feature of the program guide (e.g., by entering a command with user interface 46), the program guide generates an appropriate program guide display screen for display on monitor 45. An illustrative main-menu screen 50 is shown in FIG. 4. From the main menu, the user can access any one of a number of features of the program guide. Features indicated by main-menu screen 50 may include program listings, recording schedules, the digital storage medium directory, program guide setup, transferring stored entries and super-programs to another volume or device, and global media library. These and other features will be described below.

When main-menu screen 50 is displayed on monitor 45, the user may access a feature by indicating a desire to do so. This can be done, for example, by using user interface 46 to position movable highlight region 56 over the desired feature. If user input interface 46 is a remote control such as remote control 40 of FIG. 2, the user can position highlight region 56 by, for example, using "up", "down", "left", and "right" cursor keys. The user can then access the desired feature by entering an appropriate command by, for example, using a "select" or "OK" key (hereinafter referred to as "selecting" the entry). The main-menu screen may also consist of "buttons" which the user "pushes" by entering appropriate commands with user interface 46 (e.g., by highlighting a button and selecting it). The program guide then generates the appropriate program guide display screen for display on monitor 45.

When a user indicates a desire to view television programming information (e.g, by selecting program listings option 48 from main-menu screen 50, or by using a "guide" key on remote control 40), the program guide generates an appropriate program listings screen for display on monitor 45. A program listings screen may contain one or more lists of programs organized according to multiple organization criteria (e.g., by program type, theme, or any other pre-defined or user defined and selectable criteria) and sorted in various ways (e.g., alphabetically). The program listings screen may be overlaid over a program being viewed by the user or overlaid over a portion of the program in a "browse" mode.

One approach is to organize program listings into a program listings grid. An illustrative program listings grid 60 is shown in FIG. 5a. Program listings grid 60 has program listings rows 62, 64, 66, and 68. Program listings row 62 contains selectable program listings for programs 1 and 2 on channel 2 (Public Television). Program listings row 64 contains selectable program listings for programs 1 and 2 on channel 3 (HBO). Program listings row 66 contains selectable program listings for programs 1, 2, and 3 on channel 4 (NBC). Program listings row 68 contains a selectable program listing for program 1 on channel 5 (FOX). The programs on each channel are typically different.

Program listings grid 60 preferably has movable cell highlight region 61, which highlights the current grid cell. The range of movement of highlight region 61 is typically bounded by column 63 on the left, by program listings time cells 65 on the top, by screen boundary 67 on the right, and by lower screen boundary 69 on the bottom.

The user may position highlight region 61 by entering appropriate commands with user interface 46. For example, if user input interface 46 is a remote control such as remote control 40 of FIG. 2, the user can position highlight region 61 using "up", "down", "left", and "right" cursor keys. If the user repeatedly moves highlight region 61 until it reaches lower screen boundary 69, further attempts at downward movement cause the program listings to scroll in the vertical direction.

Similarly, the listings in grid 60 are moved when highlight region 61 is panned (i.e., moved to the right or left). Panning highlight region 61 to the right causes the program listings in all of the program listings rows 62, 64, 66, and 68 to pan to the left by an equal amount. This allows new program listings to be displayed. Time cells 65 are adjusted accordingly (i.e., by incrementing each cell by 30 minutes). If highlight region 61 is panned to the left, the program listings in rows 62, 64, 66, and 58 pan to the right.

After a user positions highlight region 61 on a desired selectable program listing, the user may access a number of program guide features. For example, the user may access additional information (typically text or graphics, but possible video) about the listing by selecting that listing. The user may obtain this information without exiting grid 60. The user makes selections by entering appropriate selection commands with user interface 46 (FIG. 3). If user interface 46 is a remote control such as remote control 40 of FIG. 2, the user may use a "select", "OK", or "info" key to make a selection.

Making a selection directs the program guide to generate a program listing information screen for display on monitor 45. An illustrative program listing information screen 70 is shown in FIG. 6. Information displayed in information screen 70 may include any information associated with the listing supplied by main facility 12. The information may include, for example, the title of the selection, a description, episode information, the channel, cast members, parental control ratings, categories, available language(s), available video formats, or other information like associated Internet web sites or computer software.

The user can exit program listing information screen 70 by indicating a desire to exit the screen by, for example, entering appropriate commands with user interface 46 (FIG. 3). If user interface 46 is a remote control such as remote control 40 of FIG. 2, the user may for example, use an "exit" or "last" key to exit the screen. The program guide may respond to a "last" command by generating the previous program guide display screen for display on monitor 45. The program guide may respond to an "exit" command by returning the user to normal television viewing.

In an alternative embodiment, the program guide may also provide selectable listings of programs currently stored on digital storage device 49 in any form of list, table, or grid. The listings may be organized according to selectable organization criteria and sorted. One approach is to use a program listings grid, as shown in FIG. 5b. This may be done, for example, by using row 145 of program listings grid 141 to indicate currently stored programs, thereby treating digital storage device 49 like an additional channel. Multiple rows may be used to organize listings according to organization criteria (e.g., by theme, program type, or any other pre-defined or user defined selectable organization criteria). In each row, the listings may be sorted (e.g., alphabetically).

Each entry in a different column 147 of row 145 may correspond to a different movie stored on digital storage device 49. To view additional titles, the user may, for example, pan right or left by using "right" and "left" cursor keys on remote control 40 of FIG. 2.

Just like program listings grid 60 of FIG. 5a, program listings grid 141 of FIG. 5b may contain highlight region 149 to select listings in any of the rows, including row 145, and thereby access program listings information screen 70 (FIG. 6) for a selected listing. If the user selects a program stored on digital storage device 49 (i.e., a listing in row 145), the program guide responds by obtaining the information associated with the listing for display in program listings information screen 70 from digital storage device 49, and by displaying program listings information screen 70. The information for program listings information screen 70 may be stored as a directory entry on digital storage device 49.

The user may also select a program stored on digital storage device 49 from grid 141 for playback. If user interface 46 is a remote control such as remote control 40 of FIG. 2, the user may use a digital "play" key to select the program whose listing in row 145 is surrounded by highlight region 61. The program guide responds by issuing appropriate commands to digital storage device 49 to read the selected program and to display the program. Any non-time-sensitive data associated with the program stored on digital storage device 49 may be presented to the viewer by the program guide just as it was presented when the program was originally aired. This will be described more fully below. The program guide may also provide features during playback which are similar to those provided for by current analog storage technologies (e.g., "fast-forward", "rewind", "pause", and "stop").

The program guide may also display an options screen in response to the user selection of any program listing. Such an option screen may include options like "playback", "delete", and "record" that the user may select on-screen by issuing appropriate commands with user interface 46 (e.g, by positioning a highlight region over the desired feature and selecting the feature, or by pushing an on-screen "button" that represents the option).

The user may select a program and associated program data for recording on digital storage device 49 without leaving grid 60 or grid 141. The user makes selections for digital recording by entering appropriate selection commands with user interface 46 (FIG. 3). If user interface 46 is a remote control such as remote control 40 of FIG. 2, the user may use a digital "record" key to select the program whose listing is surrounded by highlight region 61 for digital recording. If desired, the default recording techniques used by the program guide may be digital recording.

Making a selection for digital recording causes the program guide to gather information from the currently loaded digital storage medium. Such information may include the estimated amount of time remaining on the storage medium (if, for example, the digital storage medium is a partially full disk). The program guide may also check directory information on the digital storage medium and compare it to the selected program listing to determine if the selected program has already been recorded. If the program guide determines that the selection has already been recorded, re-recording is not necessary. The program guide may retain the information associated with the selected program listing (supplied by main facility 12 of FIG. 1) for access by the user (e.g., using the recording schedule screen described below).

In response to an indication by the user to digitally record a selection, the programming guide may generate a recording schedule screen for display on monitor 45. The recording schedule screen lists the programs currently scheduled for recording on digital storage device 49. An illustrative recording schedule screen 80 is shown in FIG. 7a. Recording schedule screen 80 contains a number of pieces of information which may include, for example, the volume name of the currently loaded medium, an estimate of the amount of time remaining on the medium, and a grid 81 or other suitable list or table listing the programs currently scheduled for recording and relevant recording information. Grid 81 may include the title of the selections, the channel for recording, the recording date and time, and the duration of the selection.

The user can access the associated program data supplied by main facility 12 of FIG. 1 of the programs scheduled to be recorded by indicating a desire to do so (e.g., by positioning highlight region 82 on a desired program listing and pressing an "OK" key). In response to such an indication, the program guide generates a selected program listing information screen for display on monitor 45. An illustrative selected program listing information screen 84 is shown in FIG. 7b. A selected program listing information screen is similar to a program listing information screen (see FIG. 6), but may also contain user fields that the user may edit to add information that the user desires to associate with the program. FIG. 7b shows illustrative user description field 85, user category field 86, and user other field 88. The user may edit the contents of these user fields by, for example, using user interface 46 to position highlight region 89 over the desired field and indicating the information that the user desires to associate with the program. If user interface 46 is a remote control such as remote control 40 of FIG. 2, alphanumeric keys on remote control 40 may be used, or the user may scroll through the alphabet using "up" and "down" keys to select individual letters and thereby form words in the user fields.

If all of the information does not fit on a single screen, the user can scroll downward (and upward) to view the non-displayed information by indicating a desire to so by, for example, using "up" and "down" keys on remote control 40. The program guide responds to such an indication by scrolling the screen accordingly and showing the non-displayed information.

Recording schedule screen 80 of FIG. 7a may also indicate which of the selections currently scheduled for recording will fit on the currently loaded storage medium (e.g., when a DVD is loaded in a DVD player). This may be done, for example, by using bold text or text of a different color (see, e.g., M*A*S*H and TERMINATOR listings 89). Selections that cannot fit may be indicated as such by a different indicator, like dotted line 83. Either or both indicators can be used and the types shown in FIG. 7a are for illustration purposes only.

The user can exit recording schedule screen 80 by indicating a desire to do so (e.g., by entering appropriate commands with user interface 46 of FIG. 3). If user interface 46 is a remote control such as remote control 40 of FIG. 2, the user may use, for example, an "exit" key to exit the screen. When the command is given, the program guide may respond by generating the previous screen for display on monitor 45.

The user may also view recording schedule screen 80 when not in a program listings screen. For example, if user interface 46 is a remote control such as remote control 40 of FIG. 2, the user may access recording schedule screen 80 when in main-menu screen 50 of FIG. 4 by positioning highlight region 56 (FIG. 4) over recording schedule option 52 and selecting recording schedule option 52. The user may also access recording schedule screen 80 by selecting a program from the program listings screen and selecting an on-screen "recording schedule" option from a list of on-screen options.

The user may also select programs and associated program data for digital recording when not in program listings grid 60 by indicating a desire to do so during normal television operation (e.g., by entering appropriate commands with user interface 46 of FIG. 3). If user interface 46 is a remote control such as remote control 40, this can be done by using a "record" key during television viewing. The program guide responds by generating a recording screen for display on monitor 45. An illustrative recording screen 87 is shown in FIG. 8. Recording schedule screen 87 may display information of the program currently being viewed by the user, such as the current channel, begin time, and end time for recording. The program guide may provide the user with the opportunity to edit the displayed information (e.g., the start and end time) by issuing appropriate commands with user interface 46. When finished, the program guide may return the user to normal television viewing and begin recording the selection, the program guide may generate a recording schedule screen for display on monitor 45 so that the viewer may see the recording schedule.

Before recording a new program and associated program data, the program guide may automatically cause digital storage device 49 to search for available space, and may store the program and associated program data anywhere on digital storage device 49 (e.g., between two other programs). The program and associated program data may even be stored in non-contiguous space on the storage medium. A best-fit algorithm may be used to determine where to store the program based on available free space and the length and format of the program.

The program guide may also store associated program data in a directory entry of digital storage device 49. This data can include, for example, the date and time the program was recorded, the channel the program was recorded on, the time duration of the program, the program title and description, cast members, parental control ratings, program categories, episode information, recorded languages and video formats, Internet links, graphics, or any other information supplied by main facility 12 of FIG. 1, the user, or the programmer.

Along with the program and associated program data, the program guide may also store additional components of a program on digital storage device 49. This can include additional video formats, additional languages, additional subtitles, or other data that cannot be stored in a directory entry. The program guide will either store all of the supplied video formats and languages, or store only the variant that matches the current viewer profile preferences (described below).

Unless associated program data is time sensitive, the user may interact with the data stream during playback just as when the program was originally aired. If, for example, associated program data is computer software that the user could have accessed when the program was originally aired, the software may be stored on digital storage device 49, so that the user can access the software during playback. Such software may be, for example, shopping software that allows the user to place orders for purchasing goods offered in the program. Or, a program may have associated with it an Internet link that the user can select and access an Internet site.

The program guide may also allow a user to view the directory information of the currently loaded storage medium. The user can access this feature by indicating a desire to do so by, for example, issuing the appropriate commands with user interface 46. If user interface 46 is a remote control like remote control 40 of FIG. 2, this may be done by using a "directory" or "list" key. This can also be done by accessing the main menu 50 (FIG. 4) and positioning highlight region 56 over medium directory option 53 and selecting medium directory option 53.

When the user indicates a desire to view the directory information for the currently loaded storage medium, the program guide obtains directory information from digital storage device 49 and generates a directory listing screen for display on monitor 45. An illustrative directory listing screen 90 is shown in FIG. 9. Directory listing screen 90 may indicate, for example, the volume name and available time left on the currently loaded storage medium. Directory listing screen 90 may also include directory listing grid 91.

Directory listing grid 91 contains information about entries stored on digital storage device 49. This information may include any of the directory information stored on the medium and may be presented according to the current viewer preferences (described below). It may include, for example, the title, channel, record date, record time and duration of the entries. It may also include an indication of whether the entries have been viewed. Because the directory information for directory listing screen 90 is stored digitally, it may generally be accessed rapidly (e.g., in a fraction of a second). This fast access capability makes the directory feature easy to use to quickly check the status of stored entries. This would not be possible if an analog storage device such as a standard videocassette recorded were used.

The program guide may allow the user to access a full view of all of the directory information stored for an entry. The user may access this feature while in directory listing screen 90 by indicating a desire to do so by, for example, entering appropriate commands with user interface 46. If user interface 46 is a remote control such as remote control 40 of FIG. 2, this can be done by positioning highlight region 95 over the desired entry using "up" and "down" keys, and then selecting the entry, or by selecting an on-screen "info" option.

Once the user indicates a desire to view the full directory entry information of an entry, the program guide generates a full entry information screen for display on monitor 45. An illustrative full entry information screen 100 is shown in FIG. 10. If the full directory information does not fit on one screen, the user can scroll downward (and upward) by indicating a desire to do so by, for example, using "up" and "down" keys on remote control 40. In addition, user-defined fields may be edited by positioning highlight region 101 over any user-defined field and entering information into the highlighted field (e.g., with alphanumeric keys on remote control 40).

To exit full entry information screen 100, the user indicates a desire to do so by, for example, using an "exit" key on remote control 40. The program guide responds by saving the directory information to digital storage device 49 if the information has changed and generating the previous screen for display on monitor 45.

The program guide allows a user to play back a stored entry when the user indicates a desire to do so by entering appropriate commands with user interface 46. This can be done, for example, by selecting an entry from directory listing grid 91 and using a "play" button on remote control 40, or by selecting an on-screen "play" option from a list of on-screen options generated by the program guide in response to the selection of an entry by the user. Any non-time sensitive data associated with the program may be presented to the viewer by the program guide just as it was presented when the program was originally aired.

The program guide may also edit a program and its associated data when the user indicates a desire to do so. This can by done, for example, by entering appropriate commands with user interface 46. If user interface 46 is a remote control such as remote control 40 of FIG. 2, then this can be done by using "delete" keys in a particular way (such as by using the "delete" key twice), or by using a "partial" key, when the user is in directory listing screen 90. This may also be accomplished by selecting an on-screen "edit" option provided by the program guide in response to the selection of a program listing or directory entry.

Figure 11A:
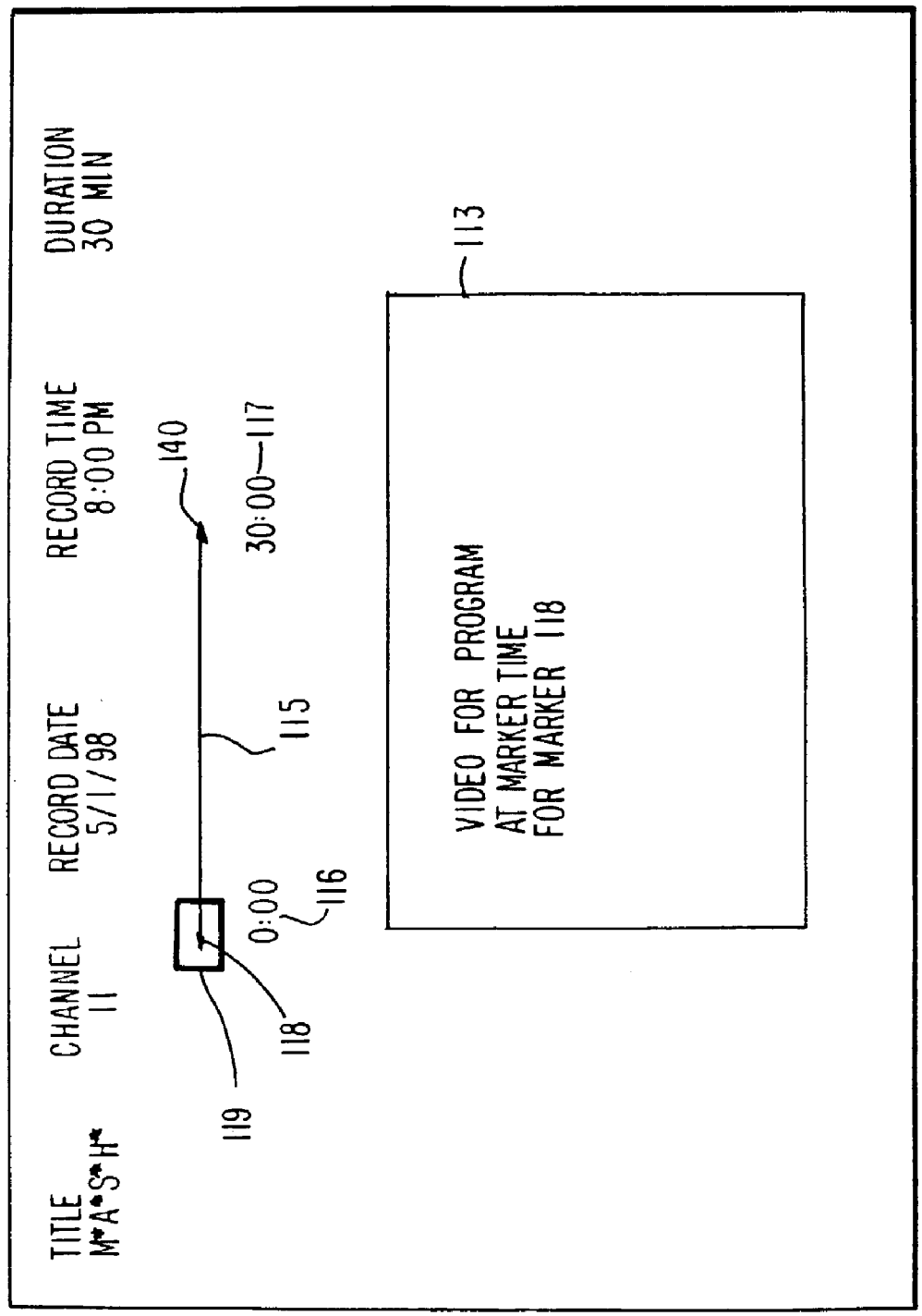
Figure 11B:
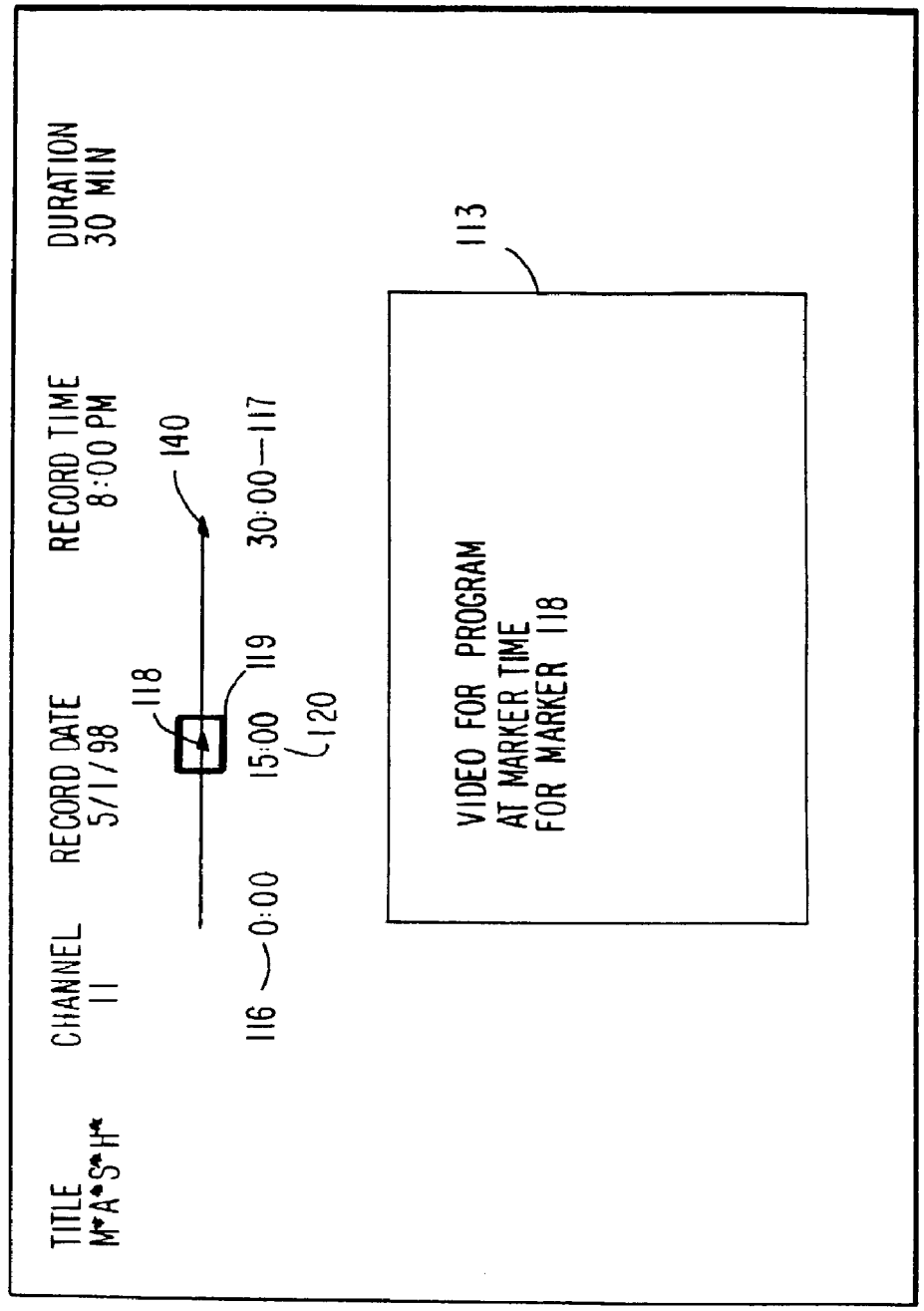
Figure 11C:
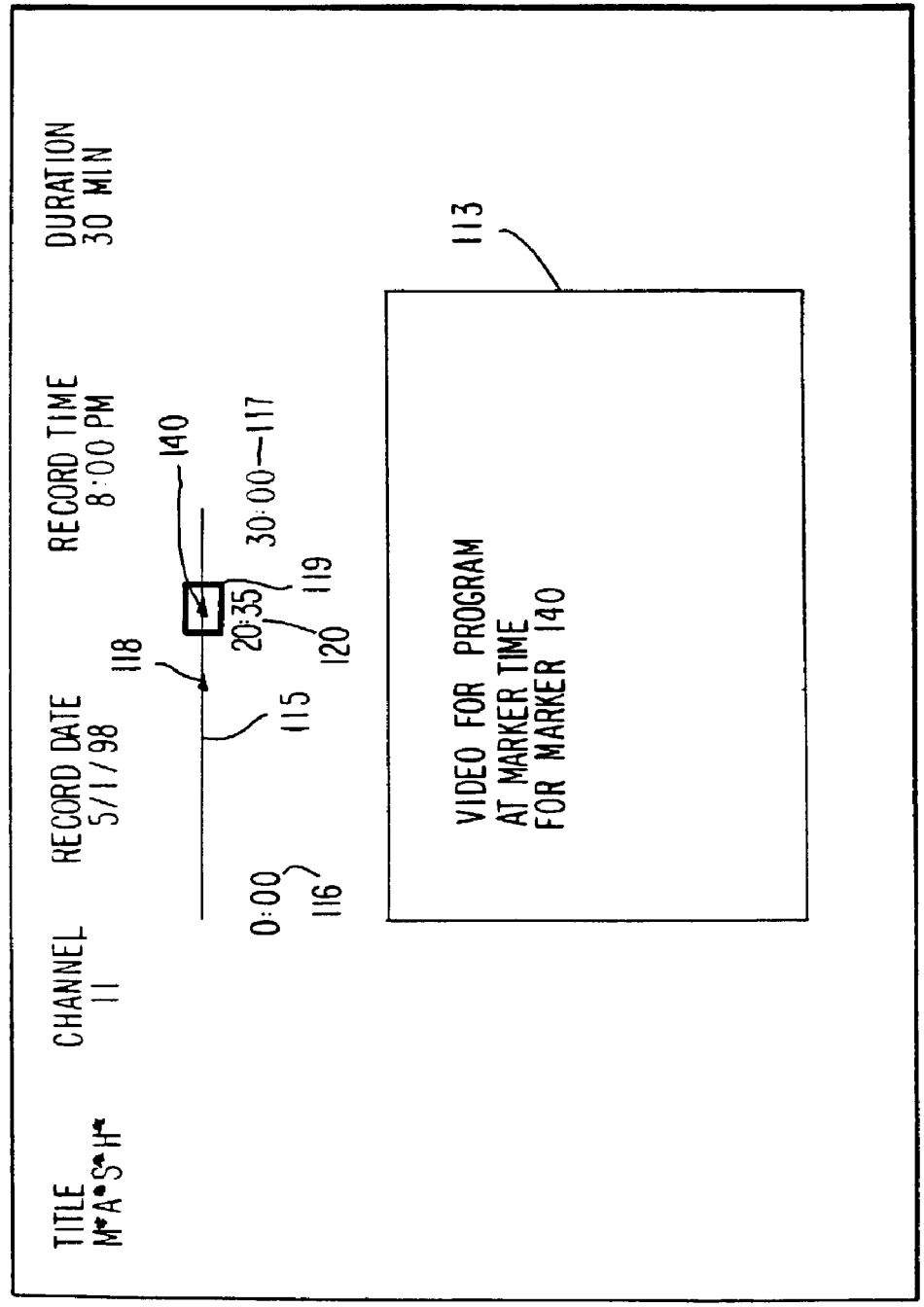

Once the user indicates a desire to edit a program, the program guide generates an edit screen for display on monitor 45. An illustrative edit screen 110 is shown in FIGS. 11a, 11b, and 11c. Screen 110 indicates the entry to be edited and other relevant information. This information may include, for example, the title, channel, record date, record time, and duration of the entry. Screen 110 may also contain edit indicator 115 for indicating the portion of the entry for deletion. Indicator 115 may have start time 116, end time 117, markers 118 and 140, and highlight region 119. Screen 110 may also have video feedback area 113 for showing the user the portion of the program corresponding to the position of markers 118 and 140.

Highlight region 119 is initially positioned by the program guide so as to surround one of the markers, for example marker 118. The user may indicate a desired starting time for deleting by positioning marker 118 (FIG. 11b). This may be done, for example, by entering appropriate commands with user interface 46. If user interface 46 is a remote control such as remote control 40 of FIG. 2, this can be done by using "left" and "right" buttons of remote control 40 to slide marker 118 left and right. As the position of marker 118 is changed, its current time position ("marker time") 120 is displayed as shown in FIGS. 11b and 11c. The beginning portion of a program is edited by leaving marker 118 in its initial position.

When the desired start time position is indicated by marker 118, the user can select marker 140 to define the end of the program segment by, for example, using the "OK" key of remote control 40. The program guide responds by positioning highlight region 119 around marker 140. The user may indicate the end time of the portion of the program to be deleted by, for example, positioning marker 140 in the same way that marker 118 was positioned, as shown in FIG. 11c.

Video feedback area 113 may display the portion of the program corresponding to markers 118 and 140 as the markers are positioned by the user. The program guide may also provide the user with the opportunity to view the portion of the program selected for deletion in a "fast-forward" playback mode, once the program portion is selected.

After the user is finished, the program guide may allow the user to continue to edit additional segments. The program guide may also return the user to a previous screen (e.g., directory listing screen 90) or to normal television viewing, when the user indicates a desire to do so (e.g., using a "last" or "exit" key on remote control 40). The program guide may also provide the user with the opportunity to confirm that the portion selected for deletion is properly defined.

Once the program portion or portions are defined, the program guide issues appropriate commands to digital storage device 49 to delete the selected program segment, additional components, and associated data as appropriate. For example, the program guide may immediately display directory listing screen 90 and issue appropriate commands to digital storage device 49 to delete the selected portion and update the directory information associated with that portion, if appropriate.

The program guide may also allow the user to define "super-programs". Super-programs are sequences of programs or program segments that the guide will play back sequentially in a specified order. The user may indicate the desire to access the super-program feature by, for example, entering appropriate commands with user interface 46. If user interface 46 is a remote control such as remote control 40 of FIG. 2, the user may use a "super-program" key on remote control 40 after positioning a highlight region such as highlight region 95 of directory listing screen 90 (FIG. 9) over a desired program listing (e.g., M*A*S*H*), or by selecting an on-screen "super-program" option from a list of on-screen options which are provided by the program guide when a program is selected.

The program guide may also provide the user with the ability to name super-programs and to store them on digital storage device 49. Entries for the named super-programs may be kept in the directory maintained on digital storage device 49, and may be displayed in screens which list directory entries (e.g., directory listing screen 90), along with the directory entries for program listings. For example, when directory listing screen 90 is displayed by the program guide, the program guide may provide the user with the opportunity to select a named super-program.

In response to the user selection of a named super-program, the program guide may generate a super-program screen for display on monitor 45. The program guide may also provide the user with an on-screen list of options for performing super-program functions (e.g., playing, transferring or editing the super-program).

Figure 12A:
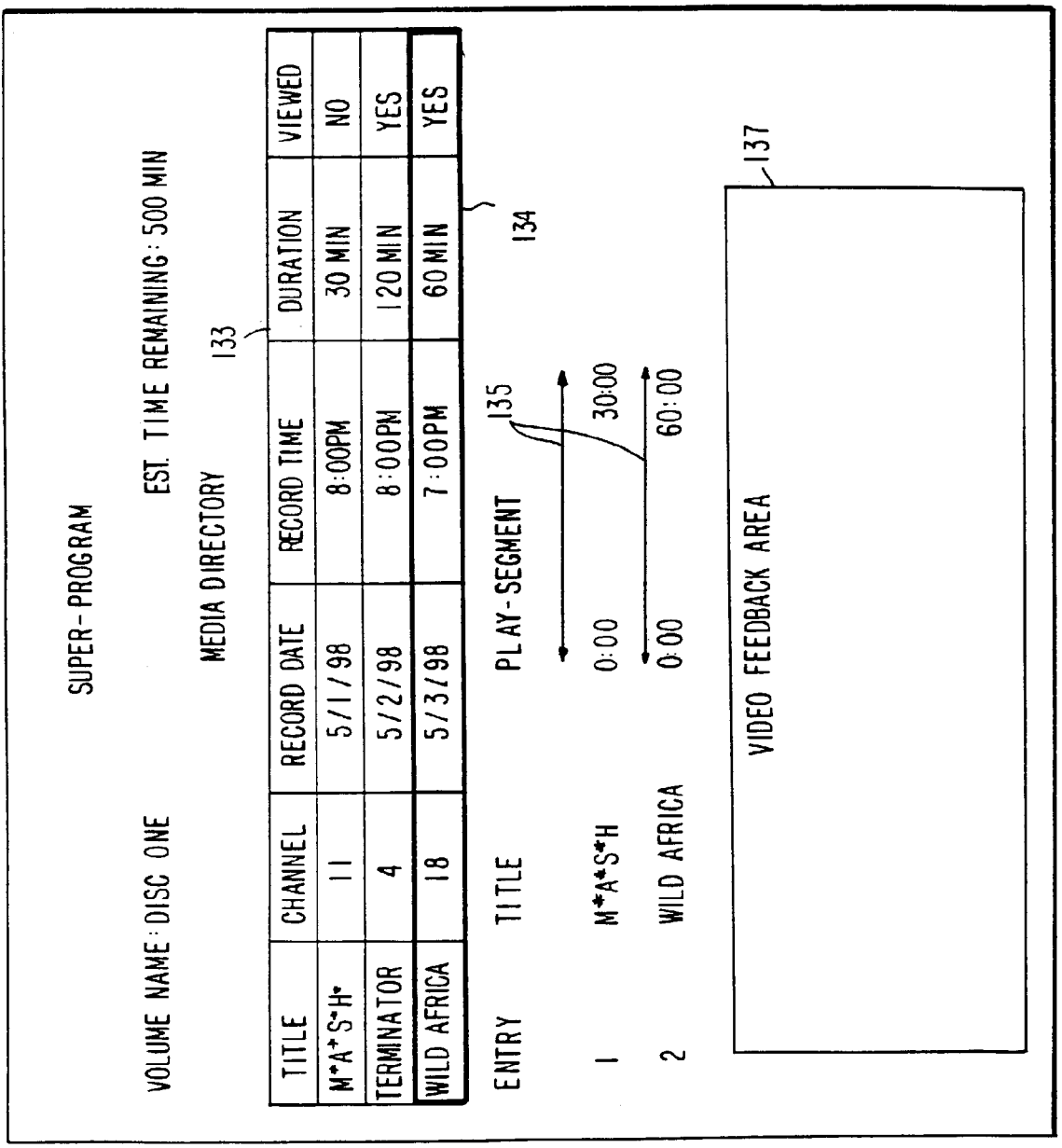
Figure 12B:
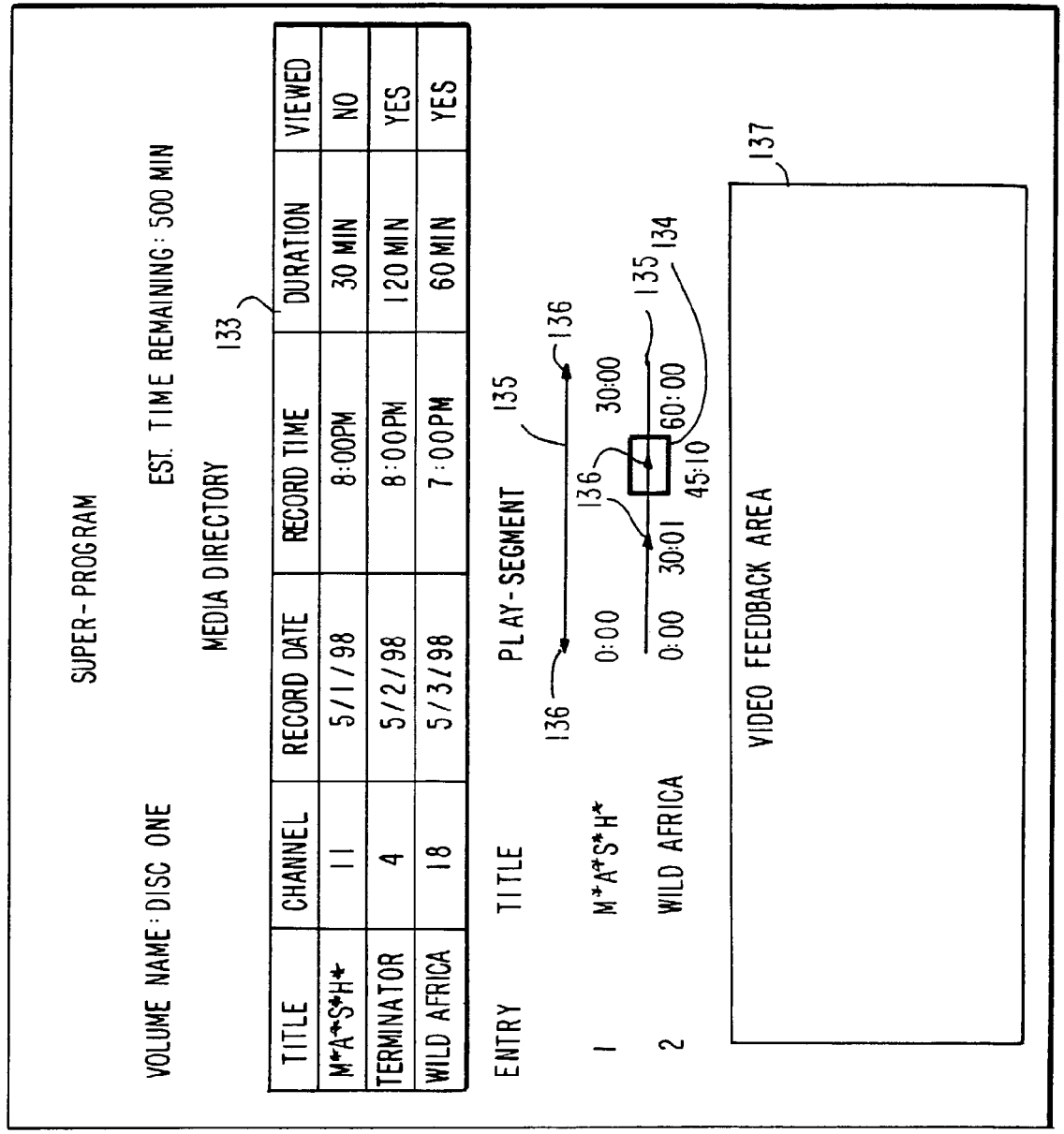

When the user indicates a desire to define a super-program, the program guide generates a super-program screen for display on monitor 45. An illustrative super-program screen 130 is shown in FIGS. 12a and 12b.

Super-program screen 130 is organized into three areas. Area 131 indicates the selections stored on digital storage device 49 (or the currently loaded digital storage medium of digital storage device 49). Area 132 indicates the super-program sequence. Video feedback area 137 displays the portion of the program included in the super-program. Super-program screen 130 may also indicate the volume name of and time remaining on the currently loaded storage medium.

The three areas of super-program screen 130 may also be presented only when needed. For example, area 131 may be displayed only when the program guide is providing the user with the opportunity to select a program stored on digital storage device 49. Once the user has selected a program, area 131 may be removed and area 132 may replace it while the program guide is providing the user with the opportunity to define a program segment for inclusion in the super-program. Video feedback area 137 may be displayed only in response to an indication by the user to the program guide to display the program segment. Thus, it may not be necessary for all three areas to be displayed at once.

To define a super-program, the user indicates which program is to be included in the super-program sequence. The program guide may also give the user the ability to include in the current super-program other previously defined super-programs. Area 131 includes a directory listing grid 133 for listing the programs and super-programs stored on digital storage device 49. If the user interface is a remote control such as remote control 40 of FIG. 2, the user may use "up" and "down" keys to position highlight region 134 on top of the desired program or super-program. The user may then select a program or super-program by using a "select" or "OK" key on remote control 40. The user may also access other information associated with the entry by using an "info" key on remote control 40, or by selecting a suitable option from an on-screen options list provided by the super-program. The program guide generates a full entry information screen containing information associated with the selected program when the "info" key is pressed.

Whenever the user selects a program, the program guide places the selected entry in the super-program sequence at a defined point in the sequence (e.g., at the end of the sequence). As shown in FIG. 12a, for example, a first segment entry has been selected by the user and the user is currently selecting the second segment entry. The segment entries are listed in second area 132. The user then has the option of defining the play segment of the program to be played. Indicators 135 indicate the currently defined play segment.

If the user wishes to define a play segment, the user may do so, for example, by using markers 136 to define the segment in the same manner described for editing programs. As shown in FIG. 12b, the user uses highlight region 134 (positioned by the program guide over one of the markers) to move the markers 136 to define the play segment. Video feedback area 137 displays the portion of the program corresponding to markers 136 as markers 136 are individually positioned. The user may indicate he or she is finished defining the play segment by, for example, using an "OK" key on remote control 40. The program guide then responds to this indication by positioning highlight region 134 (FIG. 12a) in first area 131 to allow the user to define another entry in the super-program sequence.

The user may indicate that he or she is finished defining the super-program by issuing appropriate commands with user interface 46. If user interface 46 is a remote control such as remote control 40 of FIG. 2, the user may use a "play" key to finish editing the super-program and play the super-program. The user may also select an on-screen "play" option from a list of on-screen options provided by the program guide.

The program guide responds by issuing the appropriate instructions to digital storage device 49 to read the programs and associated program data of the defined super-program sequence. The program guide then instructs television equipment 22 to provide the program and any associated data (e.g., software) in the appropriate format for display on monitor 45 and use by the user as if the user were viewing the program when it was originally aired. If monitor 45 is a television, for example, user television equipment 22 may convert the program from its digital format to the appropriate RF or demodulated video signal for display on monitor 45.

The user may also store the super-program for playback or editing at a later time. The user may indicate a desire to postpone playback by, for example, issuing appropriate commands with user interface 46. If user interface 46 is a remote control such as remote control 40 of FIG. 2, the user may use an "exit" key on remote control 40 or select an on-screen "exit" option. Control circuitry 42 responds to an indication to postpone playback by storing the playback sequence (either in memory or on the digital storage device). The user may later access the super-program by, for example, selecting the super-program while in directory listing screen 90. The program guide may respond by providing an on-screen list or options (e.g., edit, play back, transfer) that the user may select from. The program guide may also respond by generating a super-program screen with the previously entered selections and defined play-segments, providing the user with the opportunity to add, edit or re-order the programs and program segments.

The program guide may also allow the user to transfer programs and super-programs stored on digital storage device 49 to other volumes of digital storage device 49 or to secondary storage device 47 (FIG. 3.). Secondary storage device 47 may be another storage device available in the home network system like a videocassette recorder, a recordable digital video disc device, a computer (with an appropriate storage device), or other digital storage device. This feature may be accessed by, for example, issuing appropriate commands with user interface 46. If user interface 46 is a remote control such as remote control 40 of FIG. 2, the user may use a "record" or "transfer" key when in the super-program screen, or, for example, the user may select a "transfer" option from an on-screen list of options provided by the program guide in response to the user selecting a super-program from directory listing screen 90.

The program guide responds to this indication by issuing appropriate instructions to digital storage device 49 to read the selected programs and associated data or the programs and associated data of the selected super-program sequence. The program guide then transfers the programs and associated data (if possible) in an appropriate format to secondary program data storage device 47. If, for example, secondary storage device 47 is a videocassette recorder, the program guide directs user television equipment 22 to convert the digitally stored program or super-program into an appropriate analog format.

Transferring the data (e.g., software) associated with a program or super-program may not be possible with some analog secondary storage devices, so the program guide may accordingly ignore the associated data during transfer. The program guide may, however, provide for the labeling of analog storage media with associated data. Program guides that provide for labeling videocassettes with program information are described, for example, in Blackwell U.S. patent application Ser. No. 08/924,813, which is hereby incorporated by reference herein in its entirety.

The programs and data may also be transferred directly from digital storage device 49 to secondary storage device 47 via channel 43 if desired. The program guide may also transfer the programs and data to another volume of digital storage device 49.

If digital storage device 49 is a device that uses removable recording media (e.g., floppy disks or recordable optical discs) the program guide may also allow a user to view a global media library screen which indicates directory information of removable storage media used with the program guide. The user may access this feature by indicating a desire to do so by, for example entering appropriate commands with user interface 46. If user interface 46 is a remote control such as remote control 40 of FIG. 2, this may be done by, for example, using a "library" key. This may also be done by accessing main menu 50 (FIG. 4) and positioning highlight region 56 over global media library option 57 and selecting media library option 57.

The global media library may be maintained automatically by the program guide. For example, the program guide may store or update directory entry information according to the current viewer preferences (described below) in a central storage area (e.g., random access memory (RAM) or a central hard disk drive) each time directory information is stored or updated on a removable storage medium. The program guide may also store unique identifiers identifying the removable storage medium on which programs are stored (e.g., volume names or media numbers).

Figure 13:
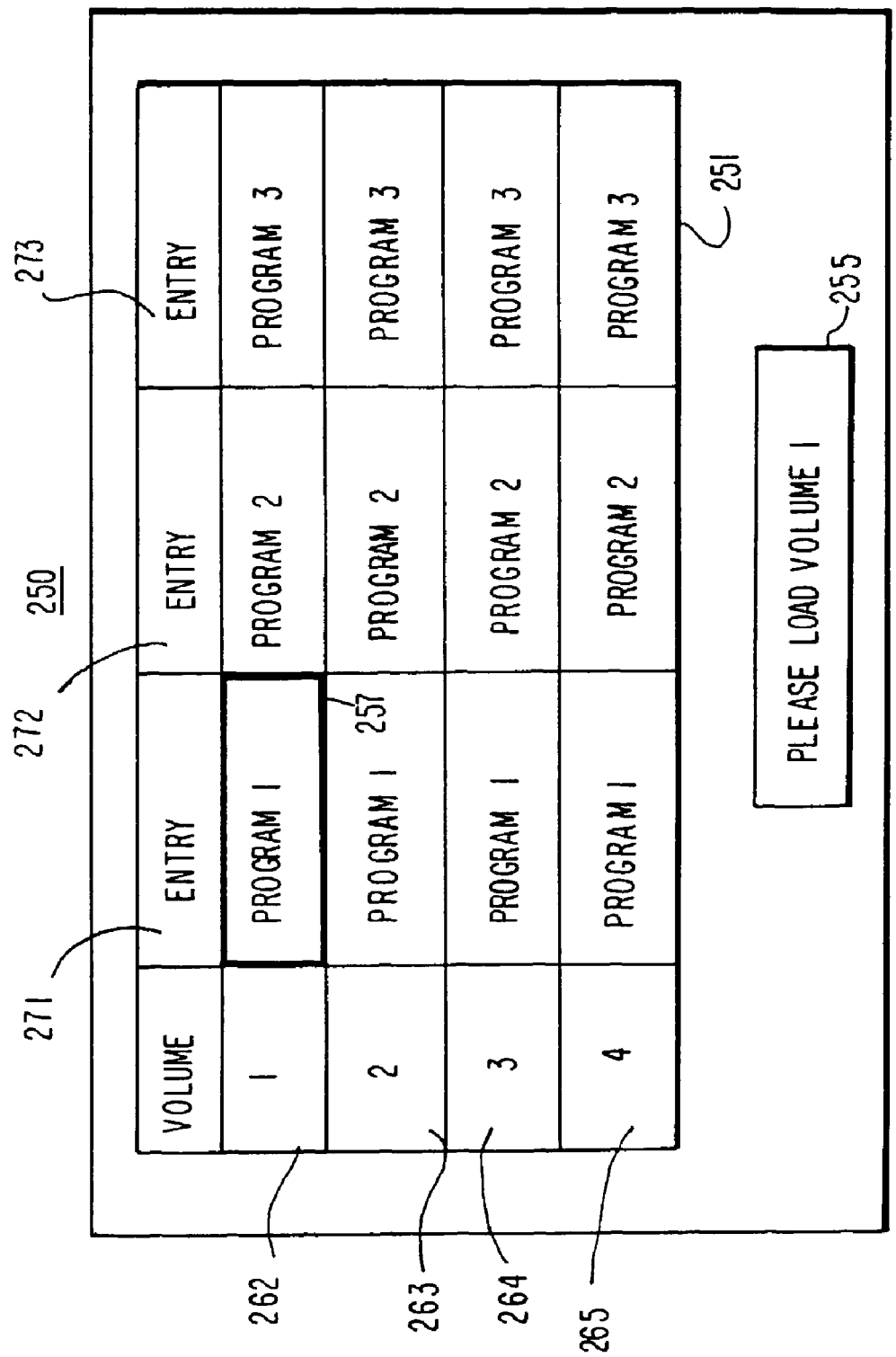

An illustrative global media library screen 250 is shown in FIG. 13. Global media library screen 250 may display program listings in any list, table, grid or other suitable form that contains information about stored entries on removable storage media used in digital storage device 49. Listings may be grouped into subsets of listings according to multiple organization criteria and sorted in various ways. Another approach is to display the listings in a library listing grid, such as library listing grid 251. Library listing grid 251 may include a row for each removable storage medium used with digital storage device 49 (e.g., rows 261, 262, 263, 264, and 265), and columns for each program stored on each removable storage medium (e.g., columns 271, 272, and 273). A user may access additional storage media and additional programs not displayed by, for example, scrolling up and down or panning left and right.

Just like directory listing screen 90 of FIG. 9, global media library screen 250 of FIG. 13 allows the user to access features of the program guide already described (e.g., by positioning highlight region 257 around a listing and selecting the listing), which may include accessing a full entry information screen, playing back, deleting and partially deleting programs, and defining super-programs containing programs from different storage media. These features may also be accessed by the user by selecting the desired feature from a list of on-screen options provided by the program guide in response to the selection of a listing by the user.

If the user indicates a desire to access a feature of the program guide which operates on a medium that is not currently loaded in digital storage device 49, the program guide may automatically change the loaded storage medium if digital storage device 49 has the ability to do so. Digital storage device 49 may be, for example, an optical jukebox with multiple recordable optical discs. If the user selects a program on a disc not currently positioned before a read/write head of the jukebox, the jukebox re-arranges the discs until the disc with the selected program is positioned for reading or writing. If the disc with the selected program is not in the jukebox, the program guide may display indication 255 to the user that the disc must be loaded. The program guide may also display such an indication if, for example, digital storage device 49 is a floppy disk drive and the disk with the selected program is not in the drive. Indication 255 may include a unique identifier identifying the unloaded storage medium. Preferably, the unique identifier is not displayed for the user unless the required removable storage medium is not loaded.

If digital storage device 49 uses removable storage media (e.g., floppy disks or recordable optical disks), the program guide may provide the user with the opportunity to enter an identifier that identifies the removable storage medium on which the program is stored. The identifier may be a volume name, a medium number, or other suitable unique indicator.

The program guide may also allow the user to choose various selectable options and select the types of information for display in various screens. The user can access this feature by indicating a desire to do so by, for example, using user interface 46 to enter appropriate commands. If user interface 46 is a remote control such as remote control 40 of FIG. 2, the user can indicate a desire to access this feature by selecting set-up option 54 from the main menu screen of FIG. 4, or by using a "set-up" key on remote control 40.

When the user indicates a desire to access the set-up feature of the program guide, control circuitry 42 generates a set-up screen for display on monitor 45. The set-up feature allows a user to select options and set user preferences. An illustrative set-up screen 220 is shown in FIG. 14. Set-up screen 220 can be organized into parts. For example, one part may be used to handle entry information display options, another may be used to handle storage options, and another may be used to handle playback options.

Entry information area 221 is an example of how set-up screen 220 may be used to display selectable components that the user may select for display in screens that display program information (e.g., program listings grid 50, recording schedule screen 80, and directory listing screen 90). Unselected directory components cannot be viewed from such screens, and can only be viewed in full information view (e.g., program listing entry information screen 70 and full entry information screen 100).

Storage option area 222 allows the user to select options relating to storage. For example, the user can select the language tracks or video formats for storing with a program. The user can also set whether a parental control feature applies to the recording of programs which do not meet certain parental control criteria. The user may also choose whether the program guide automatically erases entries from digital storage device 49 once the entries are viewed. When erased, an entry's directory information and additional components are also removed from digital storage device 49.

Playback option area 233 allows the user to select options related to playback. One selectable feature, for example, is a skip commercial feature. If active, the program guide attempts to distinguish program material from advertisements based on data recorded with the programming or other suitable cues. Any material identified as advertising is automatically skipped during playback. The user may also set default languages and video formats for playback.

Figure 15:
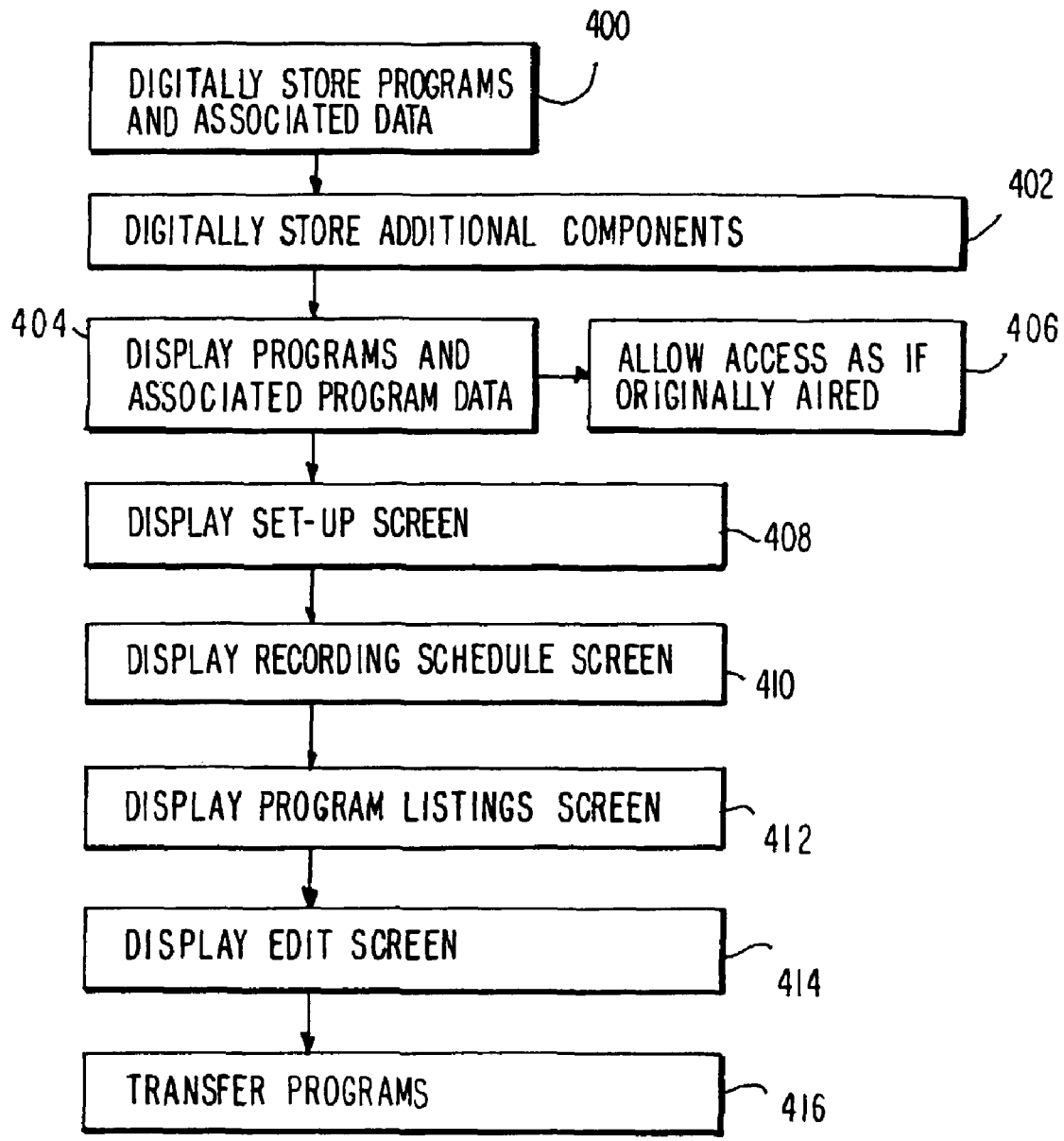
FIGS. 15-22 are flow charts of steps involved in the operation of the present invention.

Steps involved in operating the program guide of the present invention are set forth in FIGS. 15-20. FIG. 15 illustrates an overview of steps involved in accessing a number of features of the program guide. The steps illustrated by FIGS. 15-20 are illustrative and may be performed in any order.

At step 400 of FIG. 15, the programs and associated program data are stored on digital storage device 49 using the program guide. At step 402, additional components are digitally stored. At step 404, the programs and associated program data are displayed on monitor 45 (FIG. 3) using the program guide. The programs and associated-program data may be displayed on monitor 45 so as to provide the user with access to the programs and associated program data as if the programs and associated program data were being originally aired, as set forth in step 406.

At steps 408, 410, 412, and 414 the program guide displays on monitor 45 a set-up screen (such as set-up screen 220 of FIG. 14), a recording schedule screen (such as recording schedule screen 80 of FIG. 7*a*), a program listings screen (such as a screen containing program listings grid 60 of FIGS. 5*a* and 5*b*), and an edit screen (such as edit screen 110 of FIGS. 11*a*, 11*b*, and 11*c*). At step 416, the program guide transfers the programs and associated program data (if possible) to another volume of digital storage device 49 or to secondary storage device 47 (FIG. 3).

Figure 16:
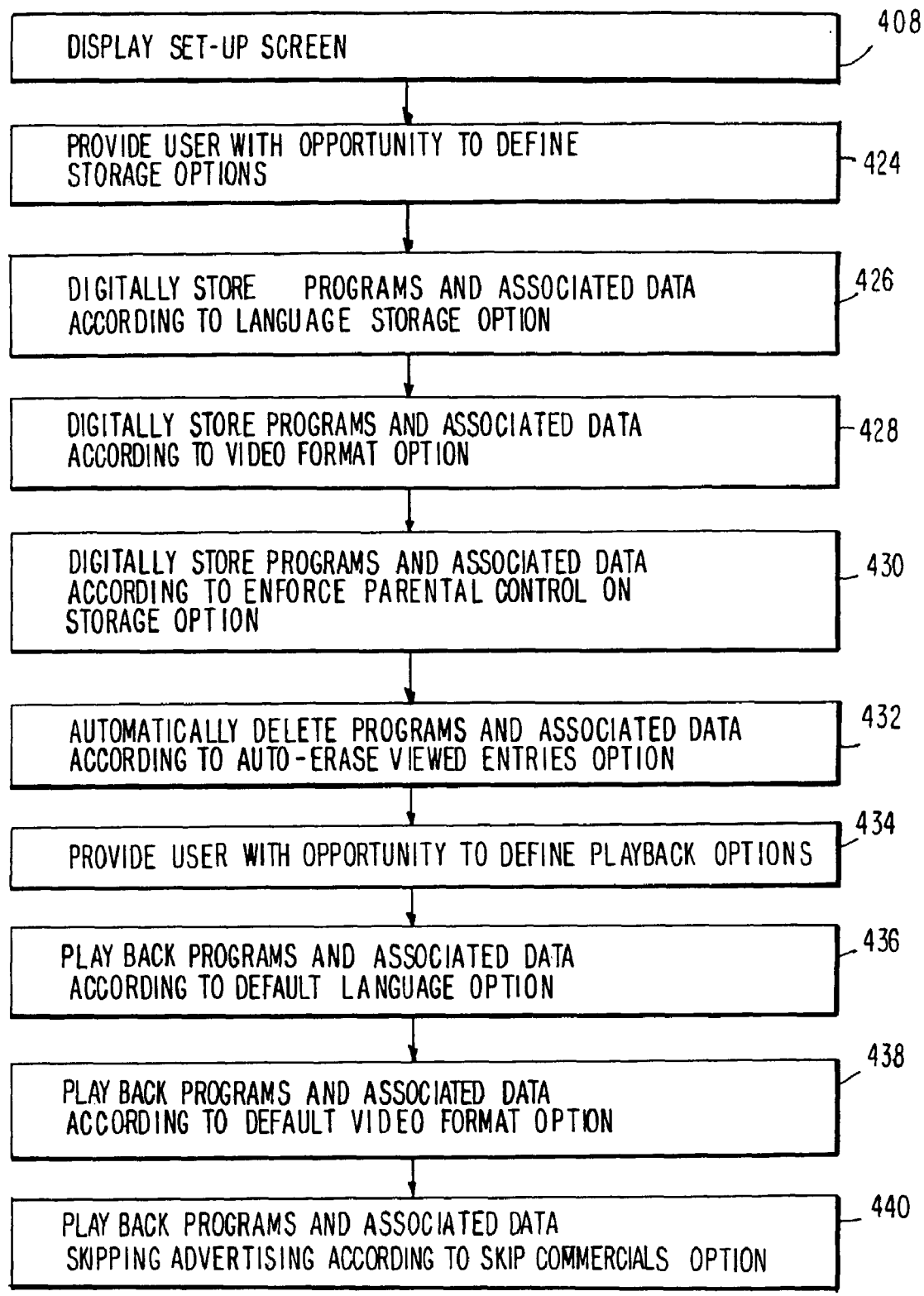

FIG. 16 illustrates steps involved providing the user with the ability to define selectable options. At step 424, the program guide provides the user with the opportunity to define storage options. If language, video format, enforcement of parental control, and auto-erase storage options are provided (FIG. 15), the program guide stores the programs and associated program data on digital storage device 49 according to how the storage options are defined as set forth in steps 426, 428, 430, and 432 respectively.

The program guide may also provide the user with the opportunity to define playback options, as set forth in step 434. If default language, default video format, and skip advertising playback options are provided, the program guide displays the programs and associated program data on monitor 45 according to how the options are defined as set forth in steps 436, 438, 440, respectively.

Figure 17:
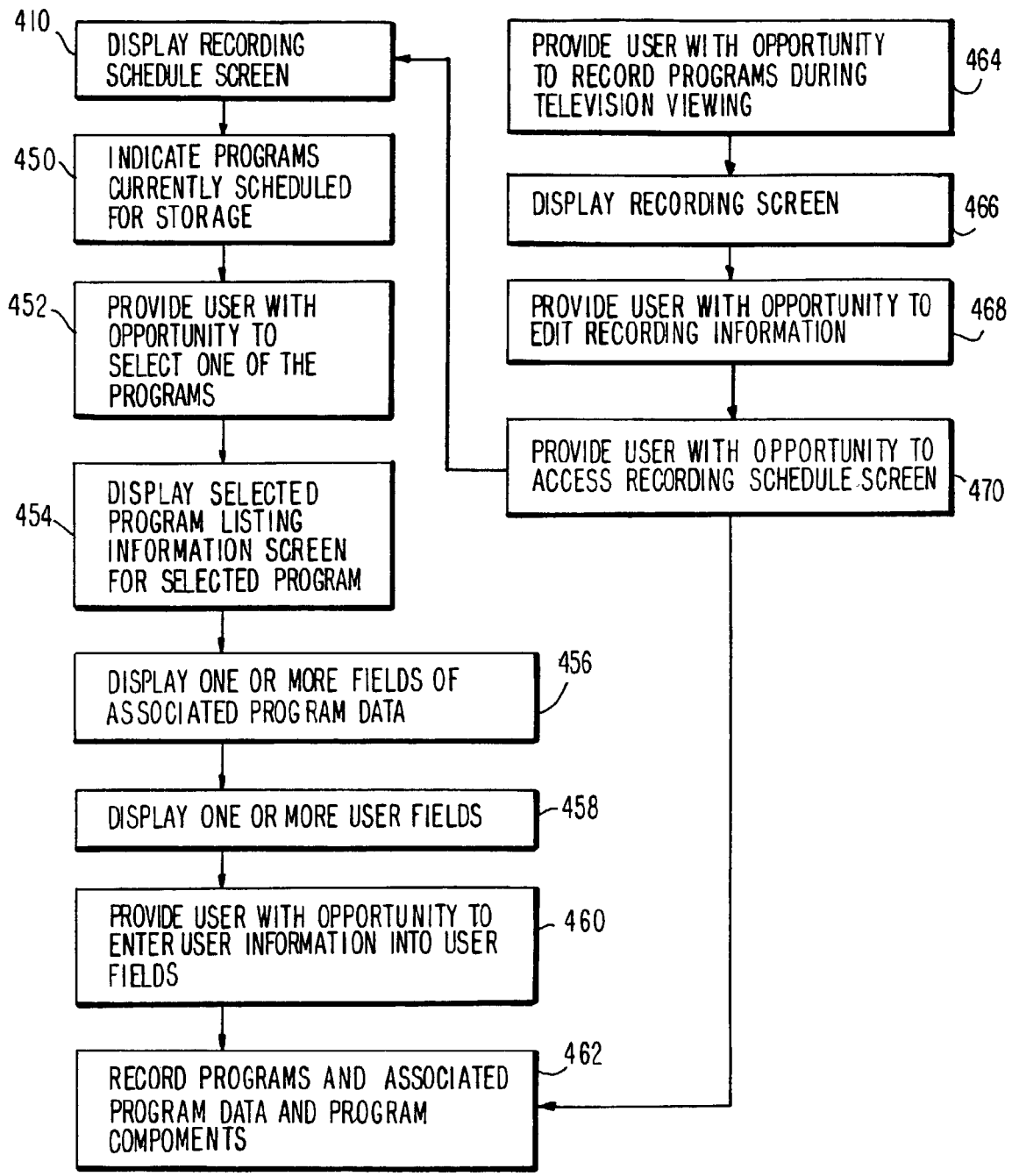

FIG. 17 illustrates steps involved in providing a user with the opportunity to record programs and associated program data on digital storage device 49. At step 410, the program guide displays a recording schedule screen, such as recording schedule screen 80 of FIG. 7*a*, on monitor 45. At step 450, the program guide indicates on monitor 45 the programs currently scheduled for storage on digital storage device 49. At step 452, the program guide provides the user with the opportunity to select one of the indicated programs.

The program guide may also display a selected program listing information screen, such as selected program listing information screen 84 of FIG. 7*b*, for a selected program on monitor 45 as set forth in step 454. The program guide displays one or more fields of associated program data in step 456, and may also display one or more user fields in step 458. At step 460, the program guide provides a user with the opportunity to enter information into user fields 460. At step 462, the program, associated data and additional components are stored on digital storage device 49.

The program guide may also provide the user with the opportunity to record programs during television viewing at step 464. At step 466, the program guide generates a recording screen for display on monitor 45. At step 468, the program guide provides the user with the opportunity to edit recording information, such as begin and end time. At step 470, the program guide provides the user with the opportunity to access the recording schedule screen. The program guide displays the recording schedule screen (step 410) or begins recording programs, associated data, and components (step 462) depending on the indication from the user.

Figure 18:
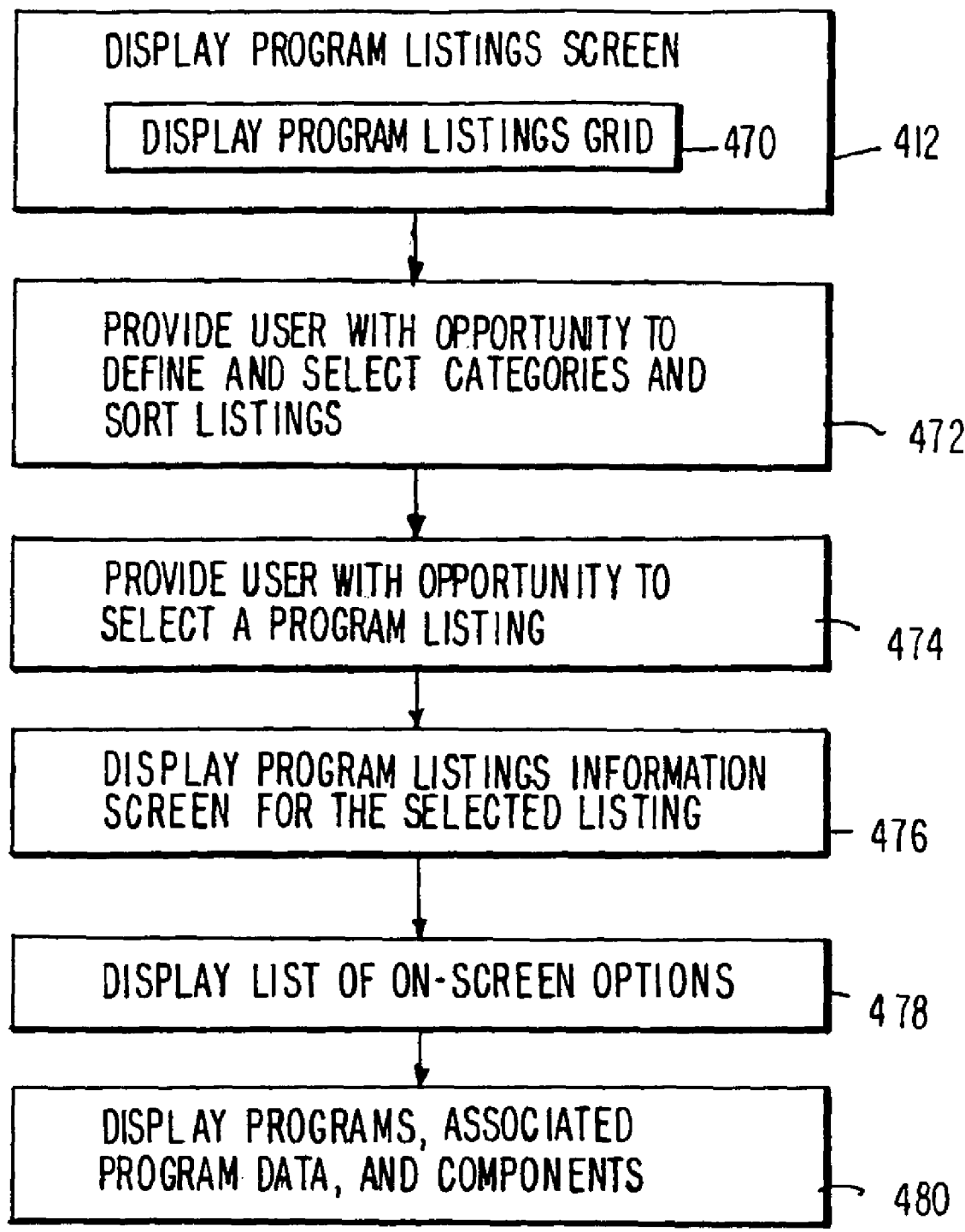

FIG. 18 illustrates steps involved in displaying program listings and program listing information on monitor 45. The program guide may display a program listings screen on monitor 45 at step 412. The program guide may include in the program listings screen a program listings grid (sub-step 470). At step 472, the program guide provides the user with the opportunity to define and select organization criteria (e.g., theme, program type, etc.) and chose a sorting method (e.g., alphabetically) for organizing and sorting the listings. At step 474, the program guide provides the user with the opportunity to select a program listing. The program guide may also display on monitor 45 a program listings information screen, such as program listings information screen 70 of FIG. 6, indicating associated program listing information.

At step 478, the program guide may provide a list of on-screen options that the user can select to access program guide features. For example, there may be on-screen "record" and "super-program" options. If super-programs and stored entries are included in the program listings screen, the program guide may also provide on-screen "transfer" and "playback" options. The program guide displays programs, associated data, and additional components at step 480. This may be program, data, and components of the selected listing. At step 480 the program guide may also return the user to the program being viewed before the program listings screen was accessed. Step 480 may also correspond to where the user watches television programming before having accessed the program listings screen.

Figure 19:
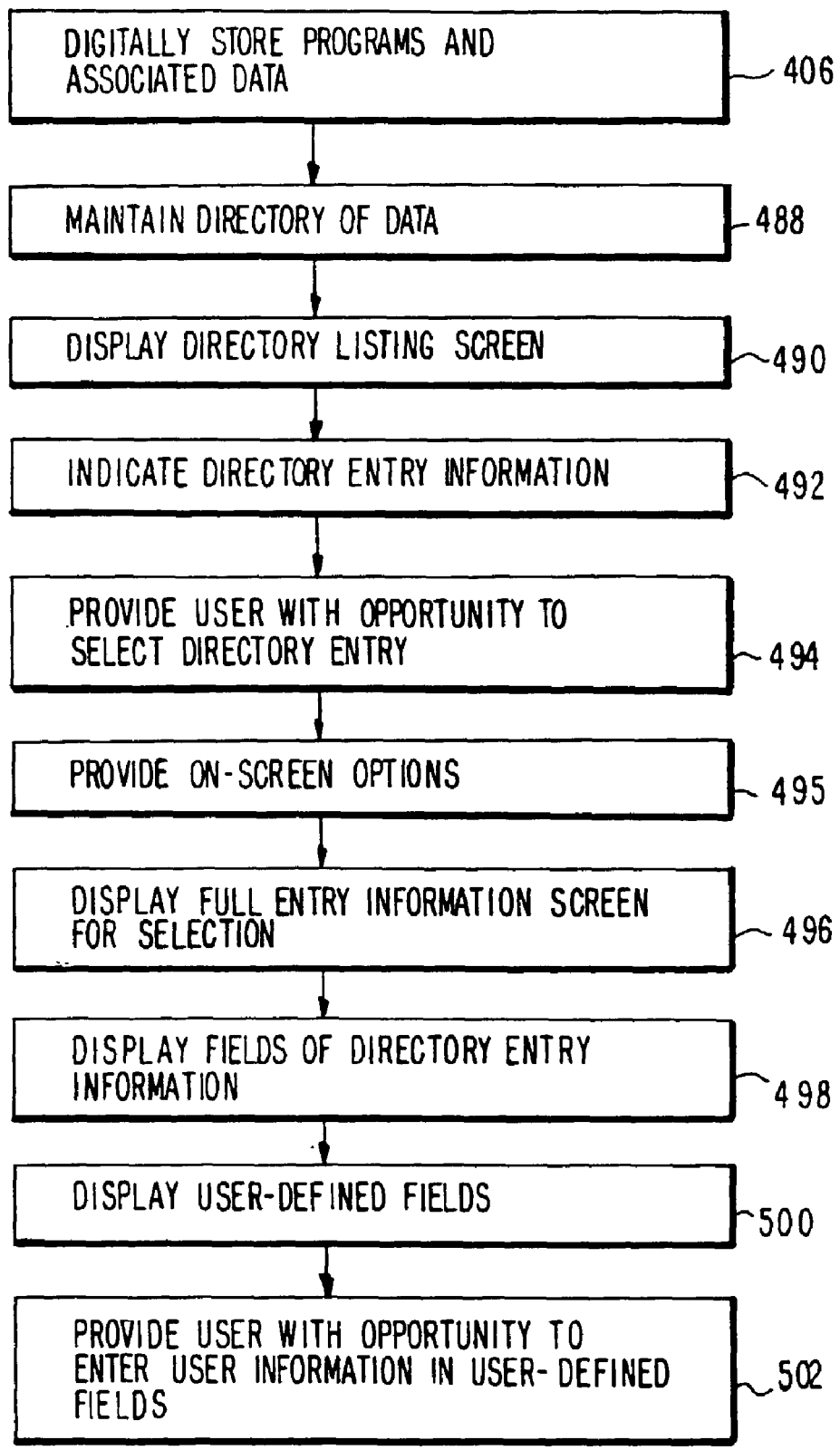

Other steps involved in accessing programs and associated data stored on digital storage device 49 are set forth in FIG. 19. The program guide stores programs and associated program data on digital storage device 49 at step 406. At step 488, the program guide maintains a directory of the stored associated program data. At step 490, the program guide displays a directory listing screen, such as directory listing screen 90 of FIG. 9, on monitor 45. The program guide indicates directory entry information at step 492 (by, for example, displaying directory listing grid 92 of FIG. 9 on monitor 45), and provides a user with the opportunity to select directory entry information at step 494. At step 495, the program guide provides the user with an on-screen list of options (e.g., "playback", "transfer", "super-program", etc.).

Steps involved in displaying additional information for a selected entry are set forth in steps 496, 498, 500, and 502. At step 496 the program guide displays a full entry information screen, such as full entry information screen 100 of FIG. 10, on monitor 45. At step 498, the program guide displays fields of directory entry information on monitor 45, and at step 500 the program guide displays user-defined fields on monitor 45. At step 502, the program guide provides the user with the opportunity to enter user information in the user-defined fields.

Figure 20:
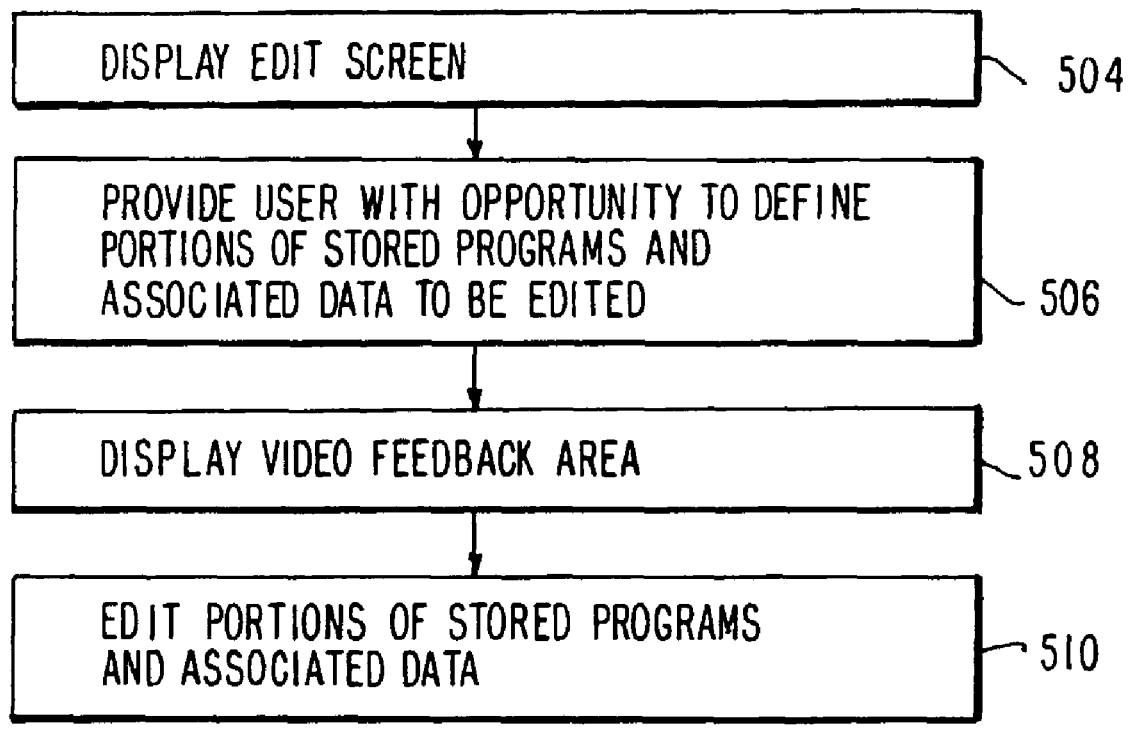

Steps involved in editing programs and associated program data associated with directory entry information are set forth in steps 504, 506, 508, and 510 of FIG. 20. The program guide displays an edit screen, such as edit screen 110 of FIGS. 11a, 11b, and 11c, on monitor 45. At step 506, the program guide provides a user with the opportunity to define the portions of stored programs and associated program data to be edited by the program guide. At step 508 the program guide displays a video feedback area on monitor 45. The program guide edits the portions of stored programs and associated data from digital storage device 45 at step 510.

Figure 21:
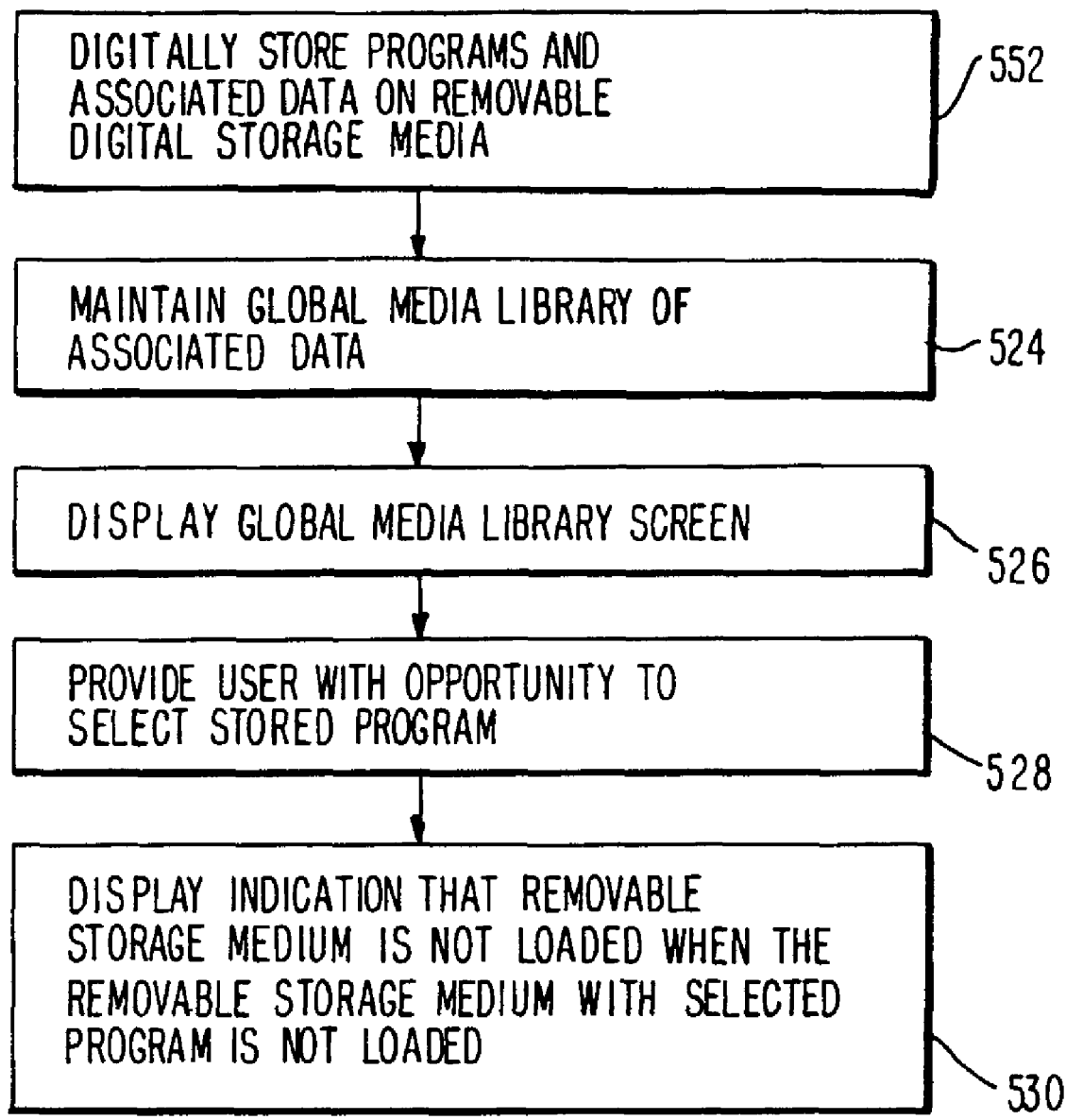

Steps involved in providing the global media library feature of the present invention are set forth in FIG. 21. At step 522, the program guide stores programs and associated program data on removable digital storage media in digital storage device 49. At step 524, the program guide maintains a global media library of the stored associated program data. The program guide displays a global media library screen, such as global media library screen 250 of FIG. 13, on monitor 45 at step 526. At step 528 the program guide provides a user with the opportunity to select a program indicated by the global media library screen. If the digital storage medium containing the selected program is not loaded in digital storage device 49, the program guide displays on monitor 45 an indication that the storage medium is not loaded at step 530.

Figure 22:
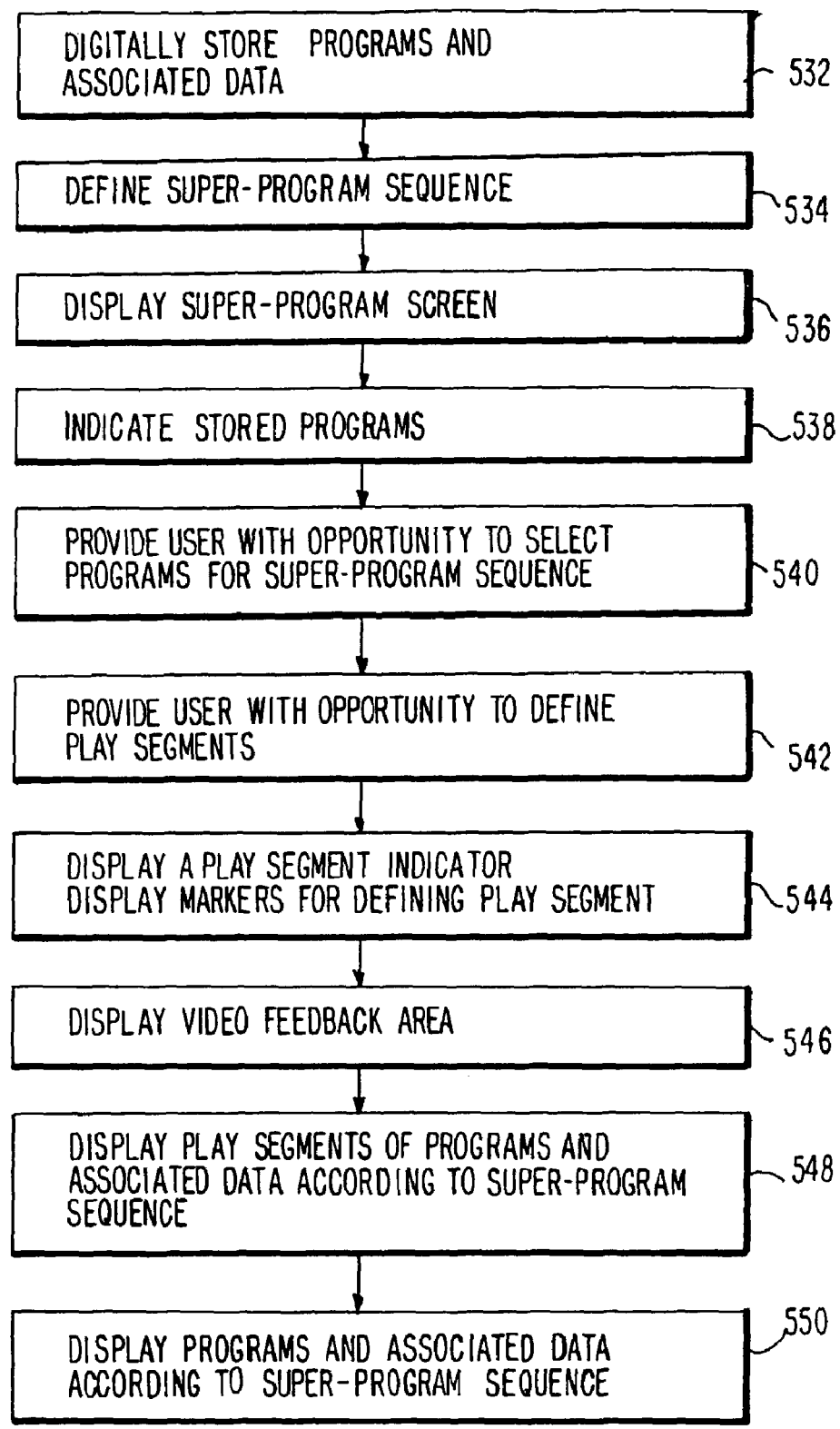

Steps involved in providing the super-program feature of the present invention are set forth in FIG. 22. The program guide stores programs and associated program data on digital storage device 45 at step 532. At step 534, the super-program sequence is defined. This may be done by displaying a super-program screen, such as super-program screen 130 of FIGS. 12a and 12b, on monitor 45 as set forth in step 536. Stored programs are indicated by the program guide on monitor 45 at step 538, and the program guide provides a user with the opportunity to select the indicated programs at step 540. The program guide displays the programs and associated program data which are part of the super-program sequence on monitor 45 according to the super-program sequence at step 550.

Further steps involved in providing the super-program feature are set forth in steps 524, 544, 546, and 548. At step 542, the program guide provides the user with the opportunity to define play segments. The program guide may display a play segment indicator and marker for defining the play segment, as indicated by step 544. At step 546, the program guide displays a video feedback area on monitor 45. The program guide displays the play segments of programs and associated program data on monitor 45 according to the super-program sequence at step 548.

The foregoing is merely illustrative of the principles of this invention and various modifications can be made by those skilled in the art without departing from the scope and spirit of the invention.

What is claimed is:

1. A method for use in an interactive television program guide system that provides a user with access to broadcast television programs and recorded programs stored on a digital storage device in the user's equipment, the method comprising:

recording programs and associated program information on a digital storage device;

allowing a user to access a list of recorded programs stored on the digital storage device;

displaying a display of selectable options, wherein the selectable options include an option for a broadcast television program and an option for a recorded program stored on the digital storage device, and wherein the option for the recorded program is associated with a designated channel that identifies the digital storage device on which the recorded program is stored;

receiving a user selection of a selectable option for a recorded program; and displaying program information associated with the recorded program in response to receiving the user selection.

2. The method of claim 1, further comprising:
providing to the user a program information screen in response to the user selecting one of the selectable options.

3. The method of claim 1, further comprising:
providing to the user stored program data associated with a recorded program in response to the user selecting the option for the recorded program.

4. The method of claim 1, further comprising:
providing the user with an opportunity to navigate the display of selectable options using a moveable highlight region.

5. The method of claim 1, wherein the selectable options represent television program listings.

6. The method of claim 5, wherein the selectable options are arranged in a grid of television program listings.

7. The method of claim 1, further comprising allowing the user to access a list of programs scheduled to be recorded on the digital storage device.

8. An interactive television program guide system that provides a user with access to broadcast television programs and recorded programs stored on a digital storage device in the user's equipment, the system comprising:
means for recording programs and associated program information on a digital storage device;
means for allowing a user to access a list of recorded programs stored on the digital storage device;
means for displaying a display of selectable options, wherein the selectable options include an option for a broadcast television program and an option for a recorded program stored on the digital storage device, and wherein the option for the recorded program is associated with a designated channel that identifies the digital storage device on which the recorded program is stored;
means for receiving a user selection of a selectable option for a recorded program; and
means for displaying program information associated with the recorded program in response to receiving the user selection.

9. The system of claim 8, further comprising:
means for providing to the user a program information screen in response to the user selecting one of the selectable options.

10. The system of claim 8, further comprising:
means for providing to the user stored program data associated with a recorded program in response to the user selecting the option for the recorded program.

11. The system of claim 8, further comprising:
means for providing the user with an opportunity to navigate the display of selectable options using a moveable highlight region.

12. The system of claim 8, wherein the selectable options represent television program listings.

13. The system of claim 12, wherein the selectable options are arranged in a grid of television program listings.

14. The system of claim 8, further comprising:
means for allowing the user to access a list of programs scheduled to be recorded on the digital storage device.

15. An interactive television program guide system that provides a user with access to broadcast television programs and recorded programs stored on a digital storage device in the user's equipment, the system comprising:
a digital storage device;
a display device; and
an interactive program guide implemented at least partially on circuitry, wherein the interactive program guide is programmed to:
record programs and associated program information;
allow a user to access a list of recorded programs stored on the digital storage device;
display a display of selectable options, wherein the selectable options include an option for a broadcast television program and an option for a recorded program stored on the digital storage device, and wherein the option for the recorded program is associated with a designated channel that identifies the digital storage device on which the recorded program is stored;
receive a user selection of a selectable option for a recorded program; and
display program information associated with the recorded program in response to receiving the user selection.

16. The system of claim 15, wherein the display device provides to the user a program information screen in response to the user selecting one of the selectable options.

17. The system of claim 15, wherein the digital storage device provides to the user stored program data associated with a recorded program in response to the user selecting the option for the recorded program.

18. The system of claim 15, wherein the display device provides the user with an opportunity to navigate the display of selectable options using a moveable highlight region.

19. The system of claim 15, wherein the selectable options represent television program listings.

20. The system of claim 19, wherein the selectable options are arranged in a grid of television program listings.

21. The system of claim 15, wherein the display device allows the user to access a list of programs scheduled to be recorded on the digital storage device.

22. A machine readable medium for providing a user with access to broadcast television programs and recorded programs stored on a digital storage device in the user's equipment, comprising machine program logic recorded thereon for:
recording programs and associated program information on a digital storage device;
allowing a user to access a list of recorded programs stored on the digital storage device;
displaying a display of selectable options, wherein the selectable options include an option for a broadcast television program and an option for a recorded program stored on the digital storage device, and wherein the option for the recorded program is associated with a designated channel that identifies the digital storage device on which the recorded program is stored;
receiving a user selection of a selectable option for a recorded program; and
displaying program information associated with the recorded program in response to receiving the user selection.

23. The machine readable medium of claim 22, further comprising machine program logic for:
providing to the user a program information screen in response to the user selecting one of the selectable options.

24. The machine readable medium of claim 22, further comprising machine program logic for:
providing to the user stored program data associated with a recorded program in response to the user selecting the option for the recorded program.

25. The machine readable medium of claim 22, further comprising machine program logic for:
providing the user with an opportunity to navigate the display of selectable options using a moveable highlight region.

26. The machine readable medium of claim 22, wherein the selectable options represent television program listings.

27. The machine readable medium of claim 26, wherein the selectable options are arranged in a grid of television program listings.

28. The machine readable medium of claim 22, further comprising machine program logic for:
allowing the user to access a list of programs scheduled to be recorded on the digital storage device.

29. A method for use in an interactive television program guide system that provides a user with access to broadcast television programs and recorded programs stored on a digital storage device in the user's equipment, the method comprising:
allowing a user to access a list of recorded programs stored on the digital storage device;
displaying a display of selectable options for both broadcast television programs and recorded programs stored on the digital storage device, wherein options for broadcast television programs are associated with one or more television channels, and an option is associated with a channel that identifies the digital storage device; and
displaying information associated with the recorded programs stored on the digital storage device in response to the user selecting the option associated with the channel that identifies the digital storage device.

30. The method of claim 29, further comprising:
providing to the user a program information screen in response to the user selecting one of the selectable options.

31. The method of claim 29, further comprising:
storing program data associated with a recorded program on the digital storage device.

32. The method of claim 31, further comprising:
providing to the user stored program data associated with the recorded program in response to the user selecting the option for the recorded program.

33. The method of claim 29, further comprising:
providing the user with an opportunity to navigate the display of selectable options using a moveable highlight region.

34. The method of claim 29, wherein the selectable options represent television program listings.

35. The method of claim 34, wherein the selectable options are arranged in a grid of television program listings.

36. The method of claim 29, further comprising allowing the user to access a list of programs scheduled to be recorded on the digital storage device.

37. An interactive television program guide system that provides a user with access to broadcast television programs and recorded programs stored on a digital storage device in the user's equipment, the system comprising:
means for allowing a user to access a list of recorded programs stored on the digital storage device;
means for displaying a display of selectable options for both broadcast television programs and recorded programs stored on the digital storage device, wherein options for broadcast television programs are associated with one or more television channels, and wherein an option is associated with a channel that identifies the digital storage device; and
means for displaying information associated with the recorded programs stored on the digital storage device in response to the user selecting the option associated with the channel that identifies the digital storage device.

38. The system of claim 37, further comprising:
means for providing to the user a program information screen in response to the user selecting one of the selectable options.

39. The system of claim 37, further comprising:
means for storing program data associated with a recorded program on the digital storage device.

40. The system of claim 39, further comprising:
means for providing to the user stored program data associated with the recorded program in response to the user selecting the option for the recorded program.

41. The system of claim 37, further comprising:
means for providing the user with an opportunity to navigate the display of selectable options using a moveable highlight region.

42. The system of claim 37, wherein the selectable options represent television program listings.

43. The system of claim 42, wherein the selectable options are arranged in a grid of television program listings.

44. The system of claim 37, further comprising:
means for allowing the user to access a list of programs scheduled to be recorded on the digital storage device.

45. An interactive television program guide system that provides a user with access to broadcast television programs and recorded programs stored on a digital storage device in the user's equipment, the system comprising:
allowing a user to access a list of recorded programs stored on the digital storage device;
a display device for displaying a display of selectable options for both broadcast television programs and recorded programs stored on the digital storage device, wherein options for broadcast television programs are associated with one or more television channels, and wherein an option is associated with a channel that identifies the digital storage device, and wherein the display device displays information associated with the recorded programs stored on the digital storage device in response to the user selecting the option associated with the channel that identifies the digital storage device.

46. The system of claim 45, wherein the display device provides to the user a program information screen in response to the user selecting one of the selectable options.

47. The system of claim 45, wherein the digital storage device stores program data associated with a recorded program on the digital storage device.

48. The system of claim 47, wherein the display device provides to the user stored program data associated with the recorded program in response to the user selecting the option for the recorded program.

49. The system of claim 45, wherein the display device provides the user with an opportunity to navigate the display of selectable options using a moveable highlight region.

50. The system of claim 45, wherein the selectable options represent television program listings.

51. The system of claim 50, wherein the selectable options are arranged in a grid of television program listings.

52. The system of claim 45, wherein the display device allows the user to access a list of programs scheduled to be recorded on the digital storage device.

53. A machine readable medium for providing a user with access to broadcast television programs and recorded programs stored on a digital storage device in the user's equipment, comprising machine program logic recorded thereon for:
- allowing a user to access a list of recorded programs stored on the digital storage device;
- displaying a display of selectable options for both broadcast television programs and recorded programs stored on the digital storage device, wherein options for broadcast television programs are associated with one or more television channels, and wherein an option is associated with a channel that identifies the digital storage device; and
- displaying information associated with the recorded programs stored on the digital storage device in response to the user selecting the option associated with the channel that identifies the digital storage device.

54. The machine readable medium of claim 53, further comprising machine program logic for:
- providing to the user a program information screen in response to the user selecting one of the selectable options.

55. The machine readable medium of claim 53, further comprising machine program logic for:
- storing program data associated with a recorded program on the digital storage device.

56. The machine readable medium of claim 55, further comprising machine program logic for:
- providing to the user stored program data associated with the recorded program in response to the user selecting the option for the recorded program.

57. The machine readable medium of claim 53, further comprising machine program logic for:
- providing the user with an opportunity to navigate the display of selectable options using a moveable highlight region.

58. The machine readable medium of claim 53, wherein the selectable options represent television program listings.

59. The machine readable medium of claim 58, wherein the selectable options are arranged in a grid of television program listings.

60. The machine readable medium of claim 53, further comprising machine program logic for:
- allowing the user to access a list of programs scheduled to be recorded on the digital storage device.

61. A method for use in an interactive program guide system that provides a user with access to broadcast programs and recorded programs stored on a digital storage device in the user's equipment, the method comprising:
- recording programs and associated program information on a digital storage device;
- allowing a user to access a list of recorded programs stored on the digital storage device;
- displaying a display of selectable options, wherein the selectable options include an option for a broadcast program and an option for a recorded program stored on the digital storage device;
- receiving a user selection of a selectable option for a recorded program; and
- displaying program information associated with the recorded program in response to receiving the user selection.

62. The method of claim 61, further comprising providing to the user stored program data associated with the recorded program in response to receiving the user selection.

63. The method of claim 62, further comprising allowing the user to interact with the stored associated program data during playback of the recorded program.

64. The method of claim 62, wherein the stored program data includes an indication of whether the recorded program has been viewed.

65. The method of claim 61, wherein the displayed program information includes a description of the recorded program.

66. The method of claim 61, wherein the displayed program information includes associated Internet web sites.

67. The method of claim 61, further comprising displaying a program information screen in response to the user selecting the option for the broadcast program.

68. The method of claim 61, wherein the displayed program information is displayed in a program information screen.

69. The method of claim 61, wherein the selectable options represent program listings.

70. The method of claim 61, wherein the selectable options are arranged in a grid of program listings.

71. The method of claim 61, further comprising allowing the user to access a list of programs scheduled to be recorded on the digital storage device.

72. An interactive program guide system that provides a user with access to broadcast programs and recorded programs stored on a digital storage device in the user's equipment, the system comprising:
- means for recording programs and associated program information on a digital storage device;
- means for allowing a user to access a list of recorded programs stored on the digital storage device;
- means for displaying a display of selectable options, wherein the selectable options include an option for a broadcast program and an option for a recorded program stored on the digital storage device;
- means for receiving a user selection of a selectable option for a recorded program; and
- means for displaying program information associated with the recorded program in response to receiving the user selection.

73. The system of claim 72, further comprising means for providing to the user stored program data associated with the recorded program in response to receiving the user selection.

74. The system of claim 73, further comprising means for allowing the user to interact with the stored associated program data during playback of the recorded program.

75. The system of claim 73, wherein the stored program data includes an indication of whether the recorded program has been viewed.

76. The system of claim 72, wherein the displayed program information includes a description of the recorded program.

77. The system of claim 72, wherein the displayed program information includes associated Internet web sites.

78. The system of claim 72, further comprising means for displaying a program information screen in response to the user selecting the option for the broadcast program.

79. The system of claim 72, wherein the displayed program information is displayed in a program information screen.

80. The system of claim 72, wherein the selectable options represent program listings.

81. The system of claim 72, wherein the selectable options are arranged in a grid of program listings.

82. The system of claim 72, further comprising means for allowing the user to access a list of programs scheduled to be recorded on the digital storage device.

83. An interactive program guide system that provides a user with access to broadcast programs and recorded programs stored on a digital storage device in the user's equipment, the system comprising:

a digital storage device;

a display device; and an interactive program guide implemented at least partially on circuitry, wherein the interactive program guide is programmed to:

record programs and associated program information;

allow a user to access a list of recorded programs stored on the digital storage device;

display a display of selectable options, wherein the selectable options include an option for a broadcast program and an option for a recorded program stored on the digital storage device;

receive a user selection of a selectable option for a recorded program; and display program information associated with the recorded program in response to receiving the user selection.

84. The system of claim 83, wherein the interactive program guide is further programmed to provide to the user stored program data associated with the recorded program in response to receiving the user selection.

85. The system of claim 84, wherein the interactive program guide is further programmed to allow the user to interact with the stored associated program data during playback of the recorded program.

86. The system of claim 84, wherein the stored program data includes an indication of whether the recorded program has been viewed.

87. The system of claim 83, wherein the displayed program information includes a description of the recorded program.

88. The system of claim 83, wherein the displayed program information includes associated Internet web sites.

89. The system of claim 83, wherein the interactive program guide is further programmed to display a program information screen in response to the user selecting the option for the broadcast program.

90. The system of claim 83, wherein the displayed program information is displayed in a program information screen.

91. The system of claim 83, wherein the selectable options represent program listings.

92. The system of claim 83, wherein the selectable options are arranged in a grid of program listings.

93. The system of claim 83, wherein the interactive program guide is further programmed to allow the user to access a list of programs scheduled to be recorded on the digital storage device.

* * * * *